(12) United States Patent
Wang

(10) Patent No.: US 9,331,823 B2
(45) Date of Patent: May 3, 2016

(54) WIRELESS COMMUNICATION APPARATUS AND METHOD

(71) Applicant: MStar Semiconductor, Inc., Hsinchu Hsien (TW)

(72) Inventor: Chung-Wei Wang, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 61 days.

(21) Appl. No.: 14/279,551

(22) Filed: May 16, 2014

(65) Prior Publication Data

US 2014/0341133 A1    Nov. 20, 2014

(30) Foreign Application Priority Data

May 16, 2013    (TW) .............................. 102117394 A

(51) Int. Cl.
| | |
|---|---|
| *H04W 72/04* | (2009.01) |
| *H04W 52/40* | (2009.01) |
| *H04L 5/00* | (2006.01) |
| *H04W 24/10* | (2009.01) |
| *H04W 36/00* | (2009.01) |
| *H04W 88/06* | (2009.01) |

(52) U.S. Cl.
CPC *H04L 5/00* (2013.01); *H04L 5/001* (2013.01); *H04W 24/10* (2013.01); *H04W 36/0088* (2013.01); *H04W 72/0453* (2013.01); *H04W 88/06* (2013.01)

(58) Field of Classification Search
CPC ..... H04W 28/04; H04W 72/04; H04W 36/30; H04W 16/28; H04W 74/04; H04B 7/2643
See application file for complete search history.

(56) References Cited

U.S. PATENT DOCUMENTS

| | | | | |
|---|---|---|---|---|
| 2010/0041434 A1* | 2/2010 | Hirano | ................. | H04W 48/18 455/552.1 |
| 2010/0103810 A1* | 4/2010 | Kloos | ................. | H04B 7/0417 370/204 |
| 2011/0105064 A1* | 5/2011 | Kusano | ................ | H04B 7/0617 455/129 |
| 2011/0128919 A1* | 6/2011 | Kim | ..................... | H04W 48/18 370/329 |
| 2011/0164668 A1* | 7/2011 | Hoek | .................... | H04B 7/0619 375/224 |
| 2011/0199908 A1* | 8/2011 | Dalsgaard | ............. | H04W 24/10 370/241 |
| 2012/0106490 A1* | 5/2012 | Nakashima | ........... | H04W 52/42 370/329 |
| 2012/0157143 A1* | 6/2012 | Tsunekawa | ........... | H04L 5/0058 455/509 |
| 2013/0039342 A1 | 2/2013 | Kazmi | | |

(Continued)

FOREIGN PATENT DOCUMENTS

| | | |
|---|---|---|
| CN | 102325334 | 1/2012 |
| TW | 201141261 | 11/2011 |

OTHER PUBLICATIONS

Taiwan Patent Office,"Office Action", Jan. 14, 2015.

*Primary Examiner* — Andrew Lee
(74) *Attorney, Agent, or Firm* — WPAT, P.C.; Justin King

(57) ABSTRACT

A wireless communication method for a wireless communication apparatus having multiple transceivers is provided. The multiple transceivers correspond to multiple component carriers. At least one transceiver connects to at least one first base station via at least one of the component carriers. The wireless communication method includes: performing communication according to multiple component carriers corresponding to the multiple transceivers; and while performing communication by simultaneously utilizing the multiple transceivers, selecting a first transceiver from the multiple transceivers to receive information of at least one second base station.

21 Claims, 18 Drawing Sheets

(56) References Cited

U.S. PATENT DOCUMENTS

| | | | | |
|---|---|---|---|---|
| 2013/0051274 A1* | 2/2013 | Jeong | H04W 36/0094 | 370/252 |
| 2013/0109395 A1* | 5/2013 | Szufarska | H04W 36/0072 | 455/437 |
| 2013/0116011 A1* | 5/2013 | Lee | H04W 16/28 | 455/562.1 |
| 2013/0322572 A1* | 12/2013 | Green | H04H 40/18 | 375/340 |
| 2015/0056989 A1* | 2/2015 | Lee | H04W 36/04 | 455/434 |

* cited by examiner

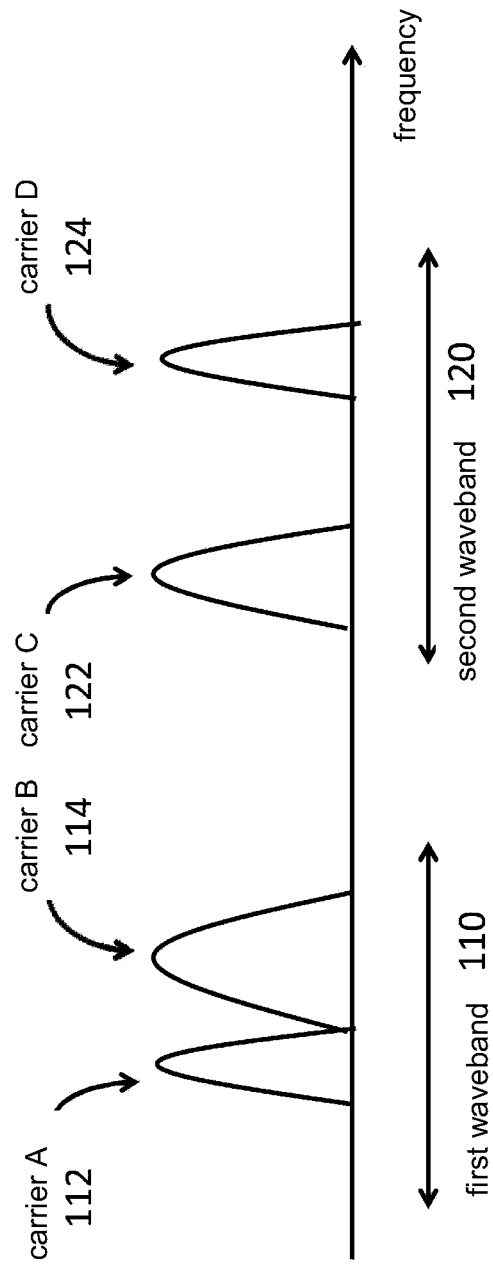

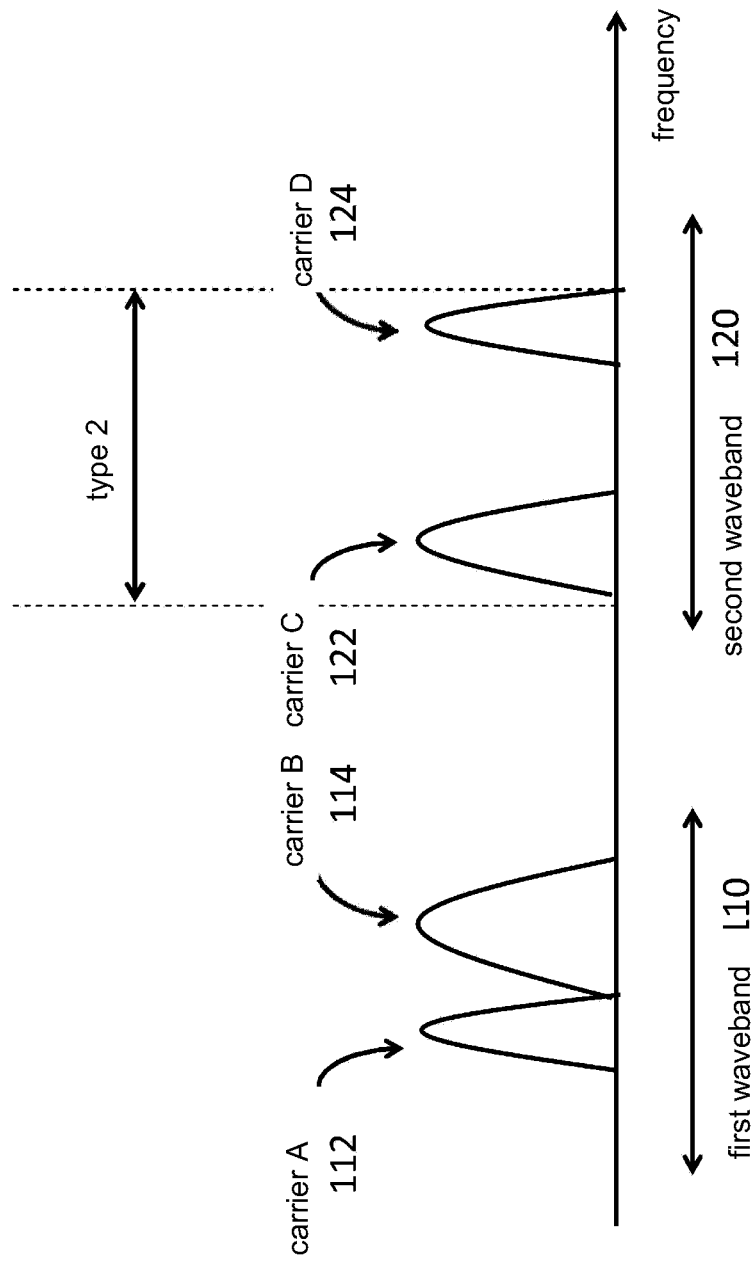

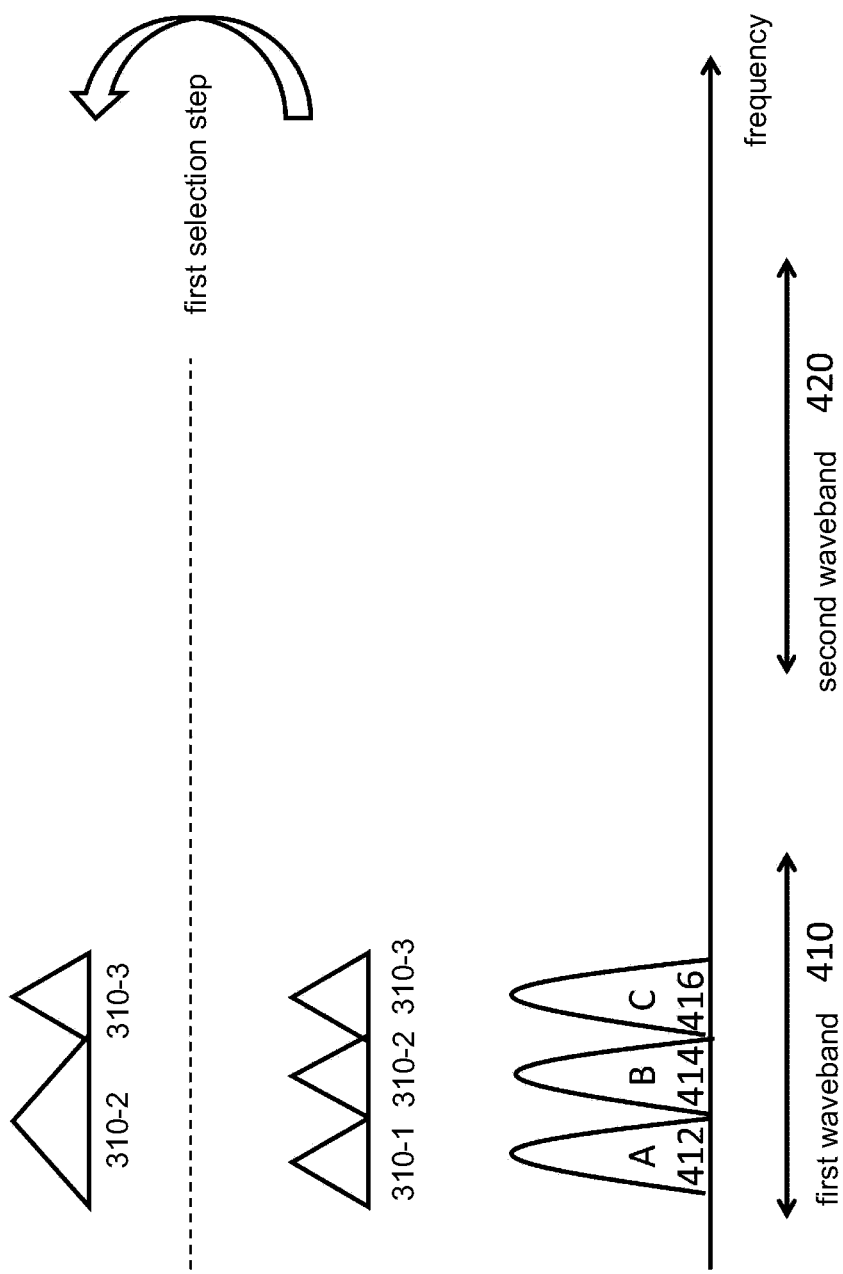

WIRELESS COMMUNICATION APPARATUS AND METHOD

This application claims the benefit of Taiwan application Serial No. 102117394, filed May 16, 2013, the subject matter of which is incorporated herein by reference.

BACKGROUND OF THE INVENTION

1. Field of the Invention

The invention relates in general to a wireless communication apparatus and method.

2. Description of the Related Art

Wireless communication apparatuses are products that modern people cannot live without in daily lives. Everyday countless numbers of wireless audios and data communication support operations of the modern lifestyle. Mobile communication bandwidths that people demand also increasingly expand as technologies continue to progress. In an era of the second-generation (2G) communication technology, the communication bandwidth falls at a level of approximately 100 Kbps. Having entered an era of the third-generation (3G) communication technology, the communication bandwidth had improved for about 100 times. Having entered an era of the fourth-generation (4G) communication technology, it is estimated that the communication bandwidth be similarly improved for about 100 times to reach a level of 1000 Mbsp, or 1 Gpbs.

With the immense demand on communication bandwidths, a considerable wireless communication frequency range is inevitably occupied regardless of the type of physical-layer communication technologies applied. Although theoretically feasible, communication frequencies of nations around the globe have long been divided and designated for various kinds of communication applications. Thus, no continuous wireless communication frequencies in such large range can be found when deploying a new generation wireless communication network. In a situation where frequencies currently with occupants cannot be released for other uses, a technology called carrier aggregation (CA) needs to be utilized.

Despite that no continuous frequencies are available for communication, carrier aggregation provides a communication capability by aggregating different carriers in multiple wavebands. FIG. 1A shows a frequency diagram of multiple wavebands including carriers having different frequencies. In FIG. 1A, the horizontal axis represents wireless communication frequencies. These wireless communication frequencies include multiple usable wavebands, e.g., a first waveband 110 and a second waveband 120 in FIG. 1A. The bandwidths of these wavebands are not necessarily the same, and the wavebands may be continuous or non-continuous wavebands. As shown in FIG. 1A, the first waveband 110 and the second waveband 120 are non-continuous.

The first waveband 110 may include multiple unoccupied carrier frequencies, e.g., a carrier A 112 and a carrier B 114. The carrier A 112 and the carrier B 114 in FIG. 1A are continuous, and may have different bandwidths. For example, the bandwidth of the carrier B 114 in FIG. 1A is larger than the bandwidth of the carrier A 112. The second waveband 120 may also include multiple usable carrier frequencies, e.g., a carrier C 122 and a carrier D 124. The bandwidth of the carrier C 122 may be different from or the same as the bandwidth of the carrier D 124. A wireless communication apparatus that does not support carrier aggregation can only select one from the four carriers for communication while being incapable of utilizing the remaining three carriers.

FIG. 1B shows a frequency diagram of type 1 of carrier aggregation. A wireless communication apparatus that supports such type 1 of carrier aggregation is capable of aggregating multiple continuous carriers located in the first waveband 110, e.g., the carrier A 112 and the carrier B 114, into a communication channel. Such type of carrier aggregation is referred to as intra-band carrier aggregation with continuous component carriers. The carrier A 112 and the carrier B 114 that are aggregated are referred to as component carriers (CCs).

FIG. 1C shows a frequency diagram of type 2 of carrier aggregation. A wireless communication apparatus that supports such type 2 of carrier aggregation is capable of aggregating multiple non-continuous carriers located in the second waveband 120, e.g., the carrier C 122 and the carrier D 124, into a communication channel. Such type of carrier aggregation is referred to as intra-band carrier aggregation with non-continuous component carriers. Similarly, the carrier C 122 and the carrier D 124 that are aggregated are referred to as component carriers.

FIG. 1D shows a frequency diagram of type 3 and type 4 of carrier aggregation. The type 3 of carrier aggregation aggregates the carrier A 112 and the carrier B 114 in the first waveband 110, and the carrier C 122 in the second waveband 120. The type 4 of carrier aggregation aggregates the carrier A 112 and the carrier B 114 in the first waveband 110, and at the carrier C 122 and the carrier D 124 in the second waveband 120. These two types of carrier aggregation are referred to as inter-band carrier aggregation with non-continuous component carriers.

Among the four exemplary types of carrier aggregation, apart from the intra-band carrier aggregation with continuous component carriers, the other three types of carrier aggregation with non-continuous component carriers can only be handled by multiple transceivers. These transceivers, or referred to as a radio-frequency (RF) chain, commonly refers to signal circuits other than a baseband processor, and may include components or a combination of antennas, mixers, oscillators, amplifiers and delay circuits.

In the example of type 2 shown in FIG. 1C, the carrier C 122 and the carrier D 124 are non-continuous and are spaced by non-carrier frequencies. If this range of continuous frequencies is processed by one transceiver, the transceiver needs to spend large amounts of resources or time to remove signals of the non-carrier frequencies. In general, two transceivers are utilized to receive signals of the carrier C 122 and the carrier D 124, respectively.

Similarly, in the examples of type 3 and type 4 shown in FIG. 1D, as the component carriers are located in different wavebands, i.e., at least two component carriers are non-continuous with non-carrier frequencies in between, multiple transceivers need to be utilized to respectively handle the component carriers in the different wavebands. For example, in the example of type 3, a transceiver that processes a larger bandwidth may be utilized to handle the carrier A 112 and the carrier B 114, and another transceiver may be utilized to handle the carrier C 122. In the example of type 4, in addition to the two transceivers for type 3, a third transceiver is utilized to handle signals of the carrier D 124.

In a situation of type 1, one single transceiver that processes a larger bandwidth may be utilized to handle the carrier A 112 and the carrier B 114, or two transceivers that process smaller bandwidths may be utilized to handle the carrier A 112 and the carrier B 114, respectively. The signal quality received by transceivers that process smaller bandwidths is generally better. However, transceivers that process smaller bandwidths are flawed by occupying additional volumes as well as consuming increased costs and power consumption.

As concluded from the above description, in most types of carrier aggregation, a wireless communication apparatus needs to involve at least two transceivers in order to support carrier aggregation. In practice, when a wireless communication apparatus has activated the carrier aggregation function, it usually means that the wireless communication apparatus is currently performing high-speed transmission. Given sufficient resources to base stations and wireless carrier frequencies, a wireless communication apparatus usually activates all transceivers to perform carrier aggregation communication. However, due to the mobility of a wireless communication apparatus, good wireless channel environments to base stations with which the wireless communication apparatus communicates may not be maintained at all times. Upon entering a range of another base station that provides better services, a wireless communication apparatus needs to have the capability of learning information of another base station, so as to allow a wireless communication network to hand over signals from the original base station to another base station, and to further allow wireless communication to maintain an original bandwidth level or even yield better performance.

However, as the above wireless communication apparatus has already allotted all its transceivers to support carrier aggregation communication, the wireless communication apparatus cannot call any of the transceivers to receive information of another base station. Therefore, provided that carrier aggregation is satisfied as much as possible, there is a need for a wireless communication apparatus and method that call one of the transceivers to receive information of another base station. Similarly, for a wireless communication apparatus having multiple transceivers, even when carrier aggregation is not supported, there is also a need for a wireless communication apparatus and method that call one of the transceivers to receive information of another base station.

SUMMARY OF THE INVENTION

According to an embodiment of the present invention, a wireless communication apparatus is provided. The wireless communication apparatus includes multiple transceivers, a communication module and a processing module. The multiple transceivers correspond to multiple component carriers. At least one of the transceivers connects to at least one first base station via at least one of the component carriers. The communication module, connected to the multiple transceivers, performs communication according to the multiple component carriers corresponding to the multiple transceivers. While communication is performed by simultaneously utilizing the multiple transceivers, the processing module selects a first transceiver from the multiple transceivers to receive information of at least one second base station.

According to another embodiment of the present invention, a wireless communication method for a wireless communication apparatus having multiple transceivers is provided. The multiple transceivers correspond to multiple component carriers. At least one of the transceivers connects to at least one first base station via at least one of the component carriers. The wireless communication method includes: performing communication according to the multiple component carriers corresponding to the multiple transceivers; and while performing communication by simultaneously utilizing the multiple transceivers, selecting a first transceiver from the multiple transceivers to receive information of at least one second base station.

In yet another embodiment of the present invention, a wireless communication apparatus is provided. The wireless communication apparatus includes a communication module and a processing module. The communication module, connected to the multiple transceivers, performs communication according to multiple component carriers corresponding to the multiple transceivers. At least one of the transceivers connects to at least one first base station via at least one of the component carriers. While communication is performed by simultaneously utilizing the multiple transceivers, the processing module selects a first transceiver from the multiple transceivers to receive information of at least one second base station.

With the wireless communication apparatus and method of the present invention, given carrier aggregation is satisfied as much as possible, or when carrier aggregation is not supported, one of the transceivers is called to receive information of another base station. During the process of calling the transceiver, a part of communication contents transmitted by a part of carriers may be sacrificed. However, from perspectives of overall communication efficiency, if signals can be handed over to a base station that provides better wireless services as early as possible, the wireless communication efficiency of all of the component carriers need not be reduced as a trade-off. From such perspectives, the wireless communication apparatus and method of the present invention are capable of enhancing utilization efficiency of wireless spectra to further save time and resources for processing wireless signals.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 1A is a frequency diagram of multiple wavebands including carriers having different frequencies;

FIG. 1C is a frequency diagram of type 2 of carrier aggregation;

FIG. 4B is a schematic diagram of a first selection step performed by a wireless communication apparatus according to another embodiment of the present invention;

DETAILED DESCRIPTION OF THE INVENTION

Embodiments of the present invention are described in detail below. Apart from the disclosed embodiments, the present invention is also applicable to other embodiments. The scope of the present invention is not limited by the embodiments, and is defined in accordance with the appended claims. To better described the contents of the present invention to one person skilled in the art and to keep the diagrams clear, certain sizes and other associated scales may be emphasized to appear exaggerated, with unrelated details not entirely depicted.

Figure 1B:
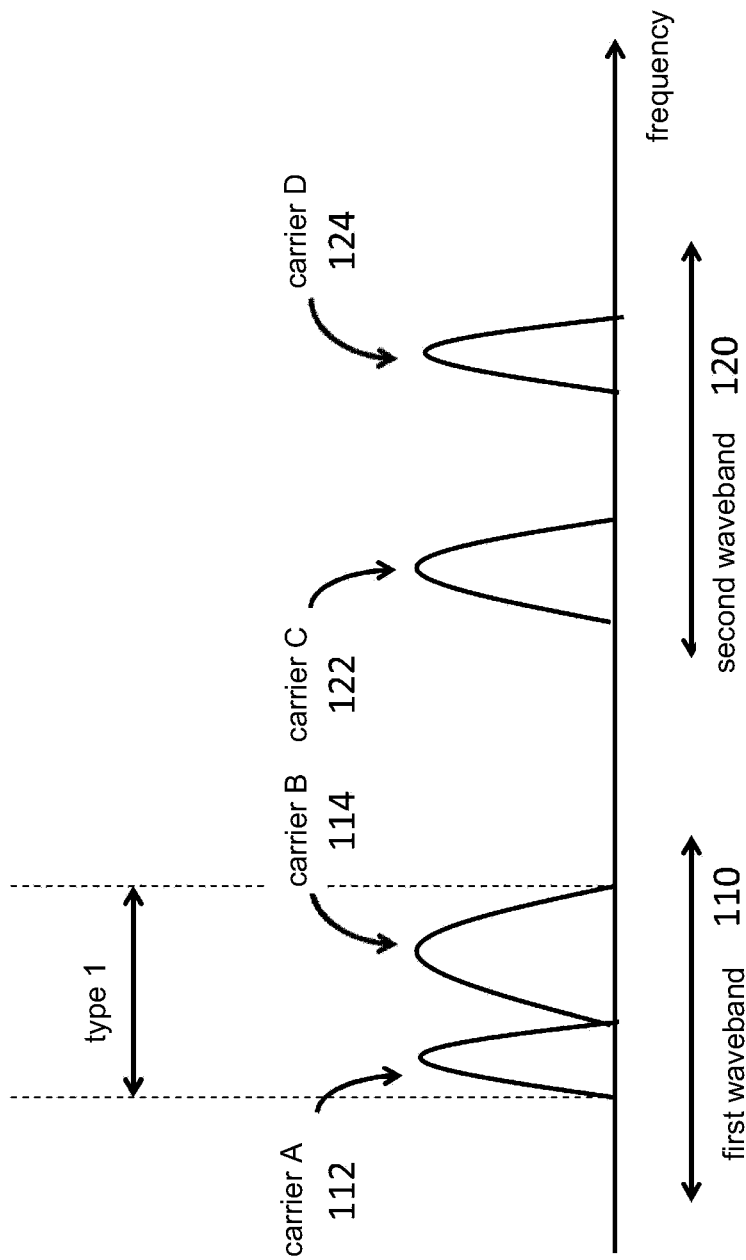
FIG. 1B is a frequency diagram of type 1 of carrier aggregation.
Figure 1D:
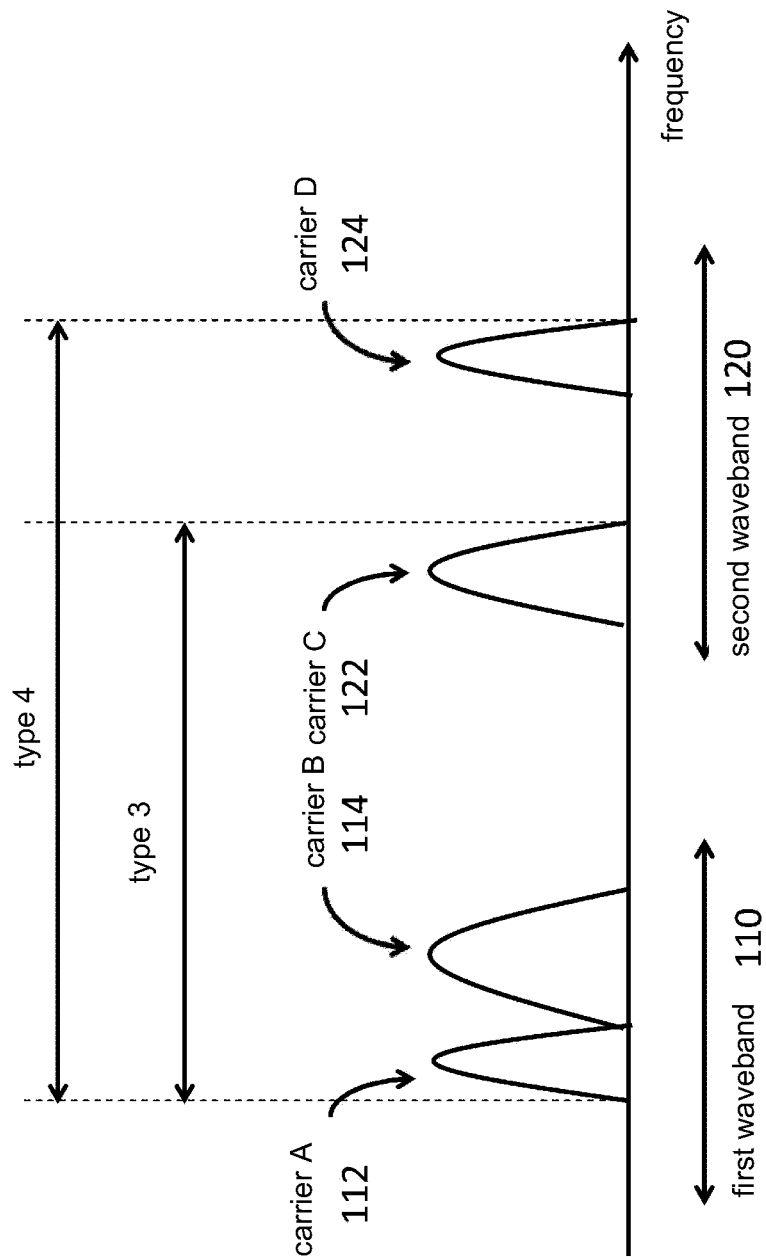
FIG. 1D is a frequency diagram of type 3 and type 4 of carrier aggregation.
Figure 2:
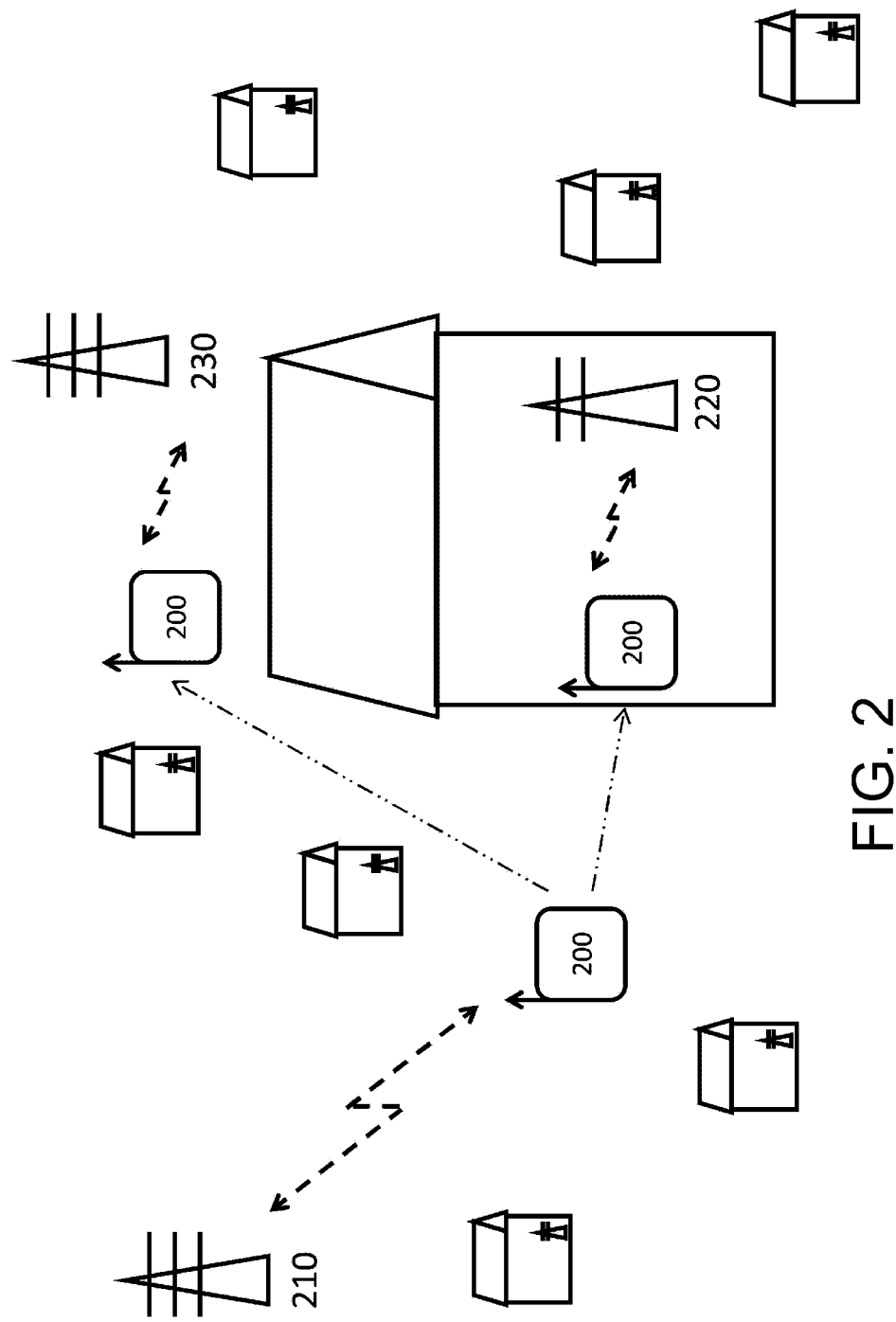
FIG. 2 is a schematic diagram connections of a wireless communication apparatus and a wireless network according to an embodiment of the present invention.

FIG. 2 shows a schematic diagram of connections of a wireless communication apparatus and a wireless network according to an embodiment of the present invention. A wireless communication apparatus 200 includes multiple transceivers, and wirelessly connects to the wireless network via at least one base station 210. The wireless communication apparatus 200 and the first base station 210 may support carrier aggregation, and perform carrier aggregation wireless communication based on multiple carriers in type 1 to type 4 described in the prior art. In one embodiment of the present invention, the wireless communication apparatus 200 may perform wireless communication via multiple first base stations 210. Among the multiple base stations 210, at least one provides primary services, and more particularly, provides control signals. To keep the following description simple and understandable, a first base station 210 is utilized in representation of the above multiple first base stations 210 that provide wireless services.

When the wireless communication apparatus 200 is moved, it may enter a wireless coverage range of another base station. For example, the wireless communication apparatus 200 may enter a building, in which a second base station 220 may be installed. The second base station 220 may be a picocell or a femtocell, and exclusively provides wireless access capabilities within the building. In another embodiment, the wireless communication apparatus 200 may move to a location close to a third base station 230. In the two examples, as being closer than the first base station 210, the second base station 220 and the third base station 230 may provide the wireless communication apparatus 200 with a better service quality.

In an embodiment, the wireless communication apparatus 200 may be a wireless communication apparatus 200 compliant to the Long-Term Evolution-Advanced (LTE-A) technology. The first base station 210 may also be a base station compliant to the LTE-A technology, referred to as an Evolved Node B (eNodeB). The second base station 220 may be a household base station compliant to the LTE-A technology, and be referred to as a Home eNodeB. The third base station 230 may be an eNodeB, or a base station compliant to other wireless technology standards such as code division multiple access (CMDA) including CDMA2000, W-CDMA and TD-S-CDMA. One person skilled in the art can easily appreciate that the exemplary embodiments of the present invention are applicable to the LTE-A technology as the LTE-A technology supports carrier aggregation. However, the present invention is not limited to the LTE-A technology, and the apparatus and method provided by the present invention are applicable to any wireless access apparatus having multiple transceivers.

The above wireless network may include multiple base stations to provide the wireless communication apparatus 200 with coverage ranges of wireless access. In an actual wireless deployment, the quantity of the second base stations 220 that cover smaller areas or indoor areas may be far greater than the quantity of the first base stations 210 that cover greater areas. A design characteristic of the second base station 200 is to allow an end user to quickly configure deployment and settings, in a way that even a wireless network operator may not know an actual location where the second base station 220 is deployed. Thus, a design blueprint of a wireless network of a wireless network operator may not include a large number of second base stations 220 that change daily. However, to benefit from better services provided by the second base station 220, the wireless communication apparatus 200 needs to transmit information of the second base station 220 to the network via the first base station 210.

Further, one wireless network operator may operate based on a wireless network of one standard technology. For example, a wireless network of an operator A connects to the first base station 210 and the second base station 220, whereas a wireless network of an operator B adopting another standard technology connects to the third base station 230. For the operator A, the third base station 230 is not included in the design blueprint of its wireless network. For the wireless communication apparatus 200, the wireless communication apparatus 200 may be configured to roam between the operator A and the operator B. To benefit from the better services provided by the third base station 230, the wireless communication apparatus 200 needs to transmit the information of the third base station 230 to the wireless network(s) of the operator A and/or the operator B via the first base station 210.

In one embodiment, after moving, the wireless communication apparatus 200 first needs to detect information of nearby base stations (e.g., wireless identities of base stations) or measure signals of nearby base stations. The wireless detection and measurement for nearby base stations may be divided into two types. In the first type, intra-frequency measurement, an under-detection base station (e.g., the second base station 220 or the third base station 230) operates on a same carrier frequency as the first base station. In the other type, inter-frequency measurement, the under-detection base station operates on a different carrier frequency from the first base station 210.

In general, while the wireless communication apparatus 200 wirelessly communicates with the first base station 210, to complete the inter-measurement, the first base station 210 indicates idle periods, or measurement gaps, by wireless control signals. As such, the wireless communication apparatus 200 is allowed to detect information (e.g., physical cell identities) of the nearby base stations or measure signals of the nearby base stations in these idle periods or measurement gaps. In the embodiment, having learned an arrangement configuration of transceivers of the wireless communication apparatus 200, the first base station 100 may designate the wireless communication apparatus 200 to utilize which of the transceivers for measurement by utilizing the apparatus and method of the present invention. Further, it is possible that the first base station 210 does not indicate idle periods or measurement gaps for the wireless communication apparatus 200 to perform the inter-measurement. In the embodiment, the wireless communication apparatus 200 may autonomously utilize the apparatus and method of the present invention to determine which transceivers are to be designated for measurement.

In another embodiment, when a signal measurement result indicates that the second base station 220 or the third base station 230 near the wireless communication apparatus 200 has a good signal quality, the first base station 210 may further need to know other information (e.g., cell global identities) of the nearby second base station 220 or third base station 230 in order to perform hand-over or hand-off. However, it is possible that the first base station 210 does not provide the wireless communication apparatus 200 with idle periods or measurement gaps for detecting system information of the second base station 220 or the third base station 230. In the embodiment, if the wireless communication apparatus 200 having multiple transceivers wishes to measure nearby base stations in a situation where the idle periods or measurement gaps are not provided by the first base station 210, the apparatus and method of the present invention are required. Further, since the system information of the second base station 220 or the third base station 230 only appears at fixed time points, even when the network does indicate the measurement gaps, it is possible that the wireless communication apparatus 200 be incapable of detecting the system information of the second base station 220 or the third base station 230 in the indicated measurement gaps. In embodiment, when the first base station 210 does provide the idle periods or indicate the measurement gaps, the wireless communication apparatus 200 may still utilize the apparatus and method of the present invention.

In general, when the wireless communication apparatus 200 detects wireless signals of nearby base stations, identity signals of a nearby base station (e.g., the second base station 220 or the third base station 230) may be learned through information in the wireless signals. With the identity signals of the nearby base station, the wireless network to which the wireless communication apparatus 200 is connected can hand-over a communication path from the original first base station 210 to the second base station 220 or the third base station 230. After completing the hand-over or hand-off procedure, the primary service base station of the wireless communication apparatus 200 is switched from the original first base station 210 to the second base station 220 or the third base station 230. Further, the first base station 210 and the second base station 220 or the third base station 230 may adopt the same or different radio access technologies (RAT). When the first base station 210 adopts the same RAT as that of the second base station 220 or the third base station 230, such hand-over procedure is referred to as an intra-RAT hand-over. When the first base station 210 adopts a different RAT from that of the second base station 220 or the third base station 230, such hand-over procedure is referred to as an inter-RAT hand-over.

In one embodiment of the present invention, due to a large quantity of microcells or Home eNodeBs, wireless identities in the wireless signals may be repetitive. Even when the wireless communication apparatus 200 detects the wireless identities of the second base station 220, the network may remain unsure of to which second base station 220 the communication path is to be handed-over. In the LTE-A technology, the wireless identity of each base station is referred to as a physical cell identity (PCI), which has a total of 512 types. Assuming that a location where the first base station 210 is established is at a high-density metropolitan area where thousands of households may be present within a wireless range covering a radius of several kilometers, thousands of microcells or Home eNodeBs are present. In other words, multiple base stations may utilize the same physical cell identity, especially microcells or Home eNodes. In another embodiment of the present invention, a wireless identity of the third base station 230 that adopts another wireless technology may be illegible to the wireless network.

When the wireless network cannot identify base stations near the wireless communication apparatus 200 through wireless identities such as physical cell identities, the wireless network may request the wireless communication apparatus 200 to report global identities of the base stations within a predetermined period. The so-called global identities are exclusive for respective base stations. For example, in the LTE-A technology, the first base station 210 may send a cell global identity instruction "reportCGI" to the wireless communication apparatus 200 to prompt the wireless communication apparatus 200 to report the cell global identities of the nearby cells. The cell global identity exclusively represents the corresponding base station, and is included in the system information broadcasted by the base station. Different from the foregoing wireless identity, the wireless communication apparatus 200 requires a longer period to perform reception and decoding in order to obtain the global identity. Such period for reception and decoding is autonomously determined by the wireless communication apparatus 200, and the first base station 210 does not inform the wireless communication apparatus 200 when to receive the global identity. Thus, such period is referred to as an autonomous gap. The wireless communication apparatus 200 autonomously determines which periods can be designated to receive and parse the global identities of nearby base stations, and reports back to the network via the first base station 210.

In conclusion, for either measurement gaps or autonomous gaps, given the wireless communication apparatus 200 having multiple transceivers utilizes at least one of the transceivers to receive information (including wireless signal strengths, wireless identities and/or global identities) of nearby base stations, the apparatus and method of the present invention may be utilized.

Figure 3:
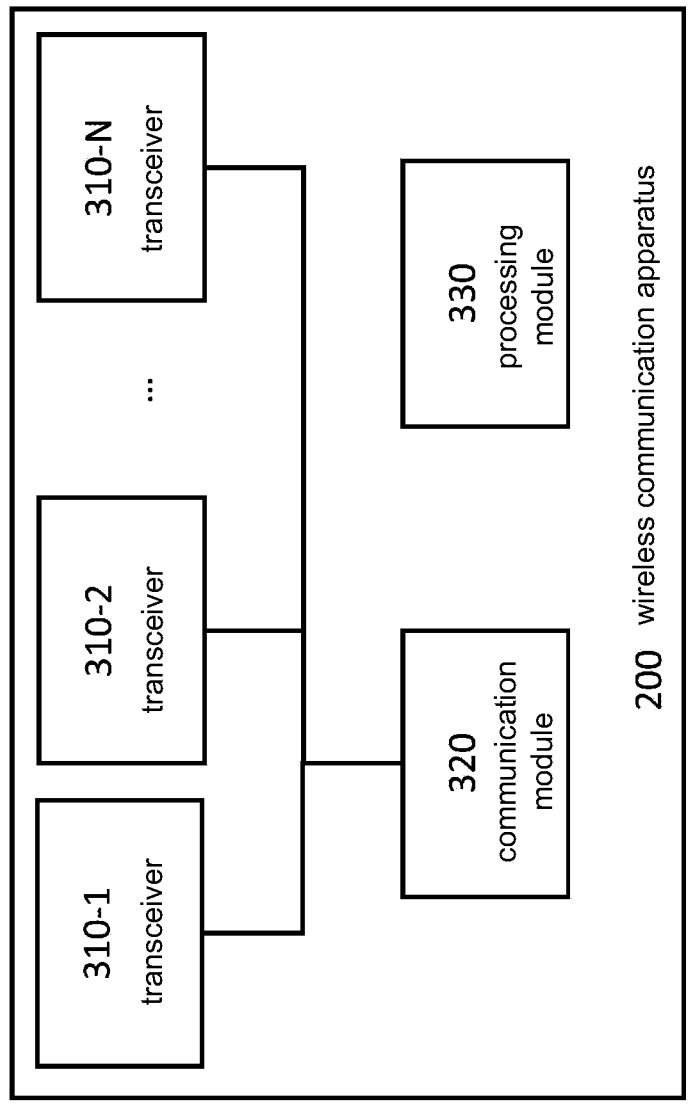
FIG. 3 is a block diagram of a wireless communication apparatus according to an embodiment of the present invention.

FIG. 3 shows a block diagram of a wireless communication apparatus 200 according to an embodiment of the present invention. The wireless communication apparatus 200 that supports carrier aggregation may include multiple transceivers (e.g., transceivers 310-1, 310-2 . . . 310-N). According to the present invention, the wireless communication apparatus 200 may utilize two or more transceivers.

Each of the transceivers 310 has an appropriate waveband and properties of a bandwidth of the waveband. For example, in the LTE technology, the bandwidth of carriers within a same waveband may be 1.4, 3, 5, 10, 15 or 20 MHz. Therefore, the transceivers compliant to the LTE technology or LTE-A technology may be transceivers that process smaller bandwidths or may be transceivers that process larger bandwidths. The wireless communication apparatus 200 supporting carrier aggregation may include one transceiver 310 that has a processing bandwidth of greater than or equal to 20 MHz. At this point, the type of carrier aggregation supported by the transceiver 310 may be limited to only type 1 of intra-band carrier aggregation with continuous component carriers. When the wireless communication apparatus 200 supporting carrier aggregation includes multiple transceivers 310, with the processing bandwidths of the transceivers 310-1, 310-2 . . . 310-N being smaller than 20 MHz, in addition to the type 1 of intra-band carrier aggregation with continuous component carriers, the transceivers 310 are also capable of handling type 2 of intra-band carrier aggregation with non-continuous component carriers, as well as type 3 and type 4 of inter-band carrier aggregation with non-continuous component carriers.

One person skilled in the art can understand that the multiple transceivers 310 in the wireless communication apparatus 200 may be of the same type or different types. They may all cover the same waveband, or may cover different wavebands. Further, they may have the same processing bandwidth, or may have different processing bandwidths. The quantity and properties of the transceivers 310 in the wireless communication apparatus 200 are dependent on various different applications, and are not limited by the present invention.

The wireless communication apparatus 200 further includes a communication module 320. The communication module 320, connected to the above multiple transceivers 310, aggregates multiple component carriers corresponding to the multiple transceivers 310 and then performs communication. For example, it is specified in one version of the LTE-A technology that, a maximum of five component carriers can be aggregated when the wireless communication apparatus 200 performs carrier aggregation. In other words, the wireless communication apparatus 200 compliant to the LTE-A technology may simultaneously include five transceivers 310 for respectively corresponding to five component carriers.

The wireless communication apparatus 200 further includes a processing module 330. When communication is performed by simultaneously utilizing the multiple transceivers 310, a first transceiver 310-1 is selected from the transceivers 310, and the selected first transceiver 310-1 is instructed to terminate the connection to the first base station 210 and to start receiving information of the second base station 220 and/or the third base station 230. The information of the second base station 220 and/or the third base station 230 includes wireless identities and/or global identities. In the embodiments below, details of how at least one first transceiver 310-1 is selected from the transceivers 310 to receive information of nearby base stations are described. When the wireless communication apparatus 200 needs to open multiple measurement gaps or autonomous gaps to measure wireless signal strengths or detect wireless identities and/or global identities of nearby base stations, the apparatus and method of the present invention may be also utilized. In another embodiment, the wireless communication apparatus 200 may perform wireless communication with the first base station 210 via only the first transceiver 310-1 among the transceivers 310, whereas the second transceiver 310-2 and the third transceiver 31-03 are respectively designated to measure the signal strengths of the second base station 220 and the third base station 230. At this point, if the network requests the wireless communication apparatus 200 to receive the cell global identity of another base station (not shown), a preferred transceiver may also be selected between the second transceiver 310-2 and the third transceiver 310-3 to receive the cell global identity of another base station.

In an embodiment of the present invention, the processing module 330 may perform a first selection step. The first selection step includes selecting a second transceiver 310-2 from the multiple transceivers 310, and rendering the second transceiver 310-2 to connect to the first base station 210 via the component carrier corresponding to the first transceiver 310-1. The component carrier corresponding to the second transceiver 310-2 and the component carrier corresponding to the first transceiver 310-1 are continuous carriers in the same waveband.

In an embodiment of the present invention, the communication module 320 and the processing module 330 may be implemented on the same chip or in a wireless communication apparatus. The chip or the wireless communication apparatus is configured to connect to the foregoing multiple transceivers 310. However, the present invention does not limit the implementation method of the transceivers 310, the communication module 320 and the processing module 330, nor does it limit that the transceivers 310, the communication module 320 and the processing module 330 need to be implemented in the same chip.

Figure 4A:
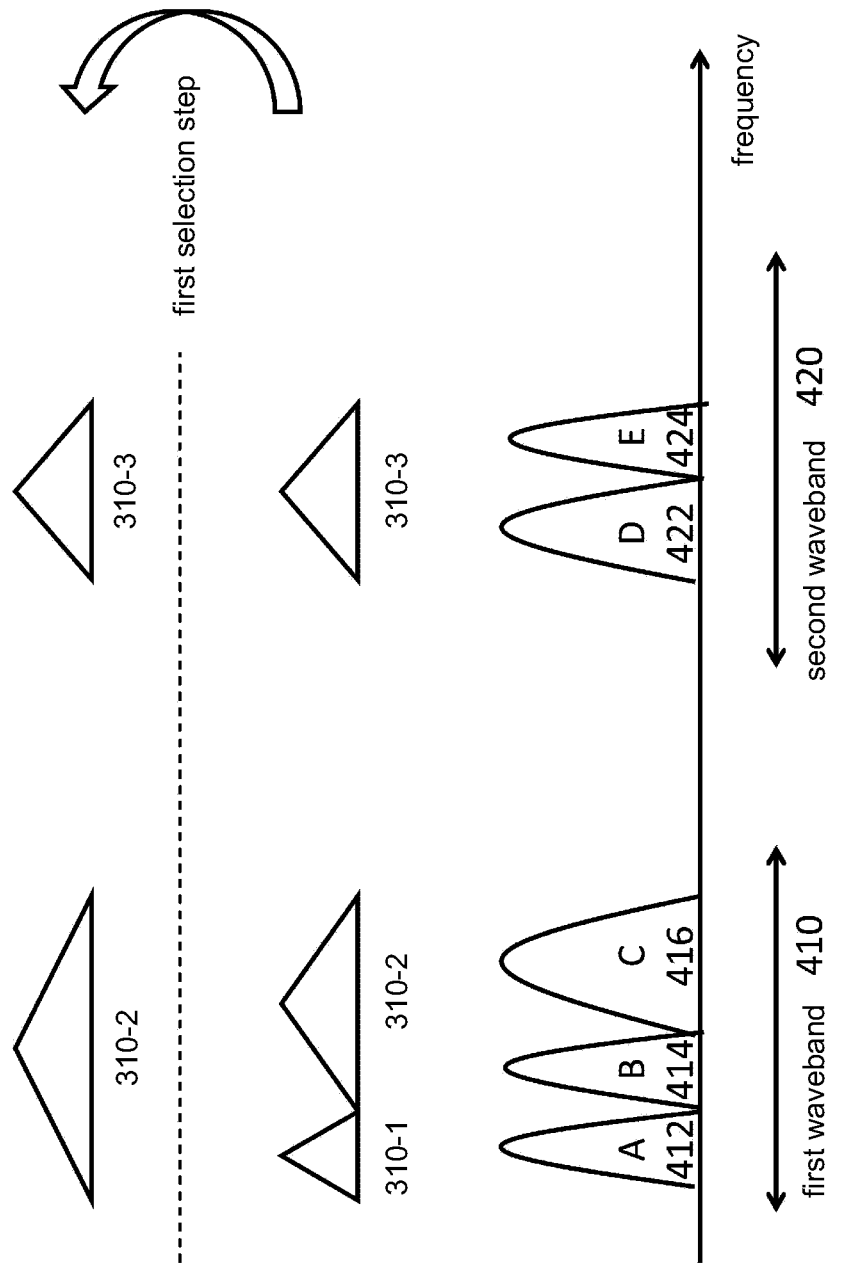
FIG. 4A is a schematic diagram of a first selection step performed by a wireless communication apparatus according to an embodiment of the present invention.

FIG. 4A shows a schematic diagram of a first selection step performed by the wireless communication apparatus 200 according to an embodiment of the present invention. In FIG. 4A, a first waveband 410 and a second waveband 420 that are non-continuous are included. The first waveband 410 includes three component carriers—a carrier A 412, a carrier B 414 and a carrier C 416 that are continuous. The second waveband 420 also includes a carrier D 422 and a carrier E 424 that are continuous. Before performing the first selection step, i.e., below the dotted line in FIG. 4A, the wireless communication apparatus 200 utilizes the first transceiver 310-1 to correspond to the carrier A 412, the second transceiver 310-2 to correspond the carrier B 414 and the carrier C 416, and the third transceiver 310-3 to correspond to the carrier D 422 and the carrier E 424, respectively.

Assume that the processing bandwidth of the second transceiver 310-2 is 20 MHz, and a total bandwidth of the three continuous carriers in the first waveband 410 is smaller than or equal to the processing bandwidth of the second transceiver 310-2. Thus, the first selection step renders the second transceiver 310-2 to process wireless communication of the carrier A 412, so that the first transceiver 310-1 may terminate the wireless communication for the carrier A 412 and receive information of nearby base stations. A result after performing the first selection step is shown above the dotted line in FIG. 4A.

FIG. 4B shows a schematic diagram of a first selection step performed by the wireless communication apparatus 200 according to another embodiment of the present invention. Identical to FIG. 4A, in FIG. 4B, the first waveband 410 includes three continuous component carriers—the carrier A 412, the carrier B 414 and the carrier C 416. Before performing the first selection step, the wireless communication apparatus 200 originally utilizes the first transceiver 310-1 to correspond to the carrier A 412, the second transceiver 310-2 to correspond to the carrier B 414, and the third transceiver 310-3 to correspond to the carrier C 416.

In the embodiment, the first transceiver 310-1 and the second transceiver 310-2 are transceivers each having a processing bandwidth of 40 MHz, and the bandwidths of the carrier A 412 and the carrier B 414 are both 20 MHz. Reception performance of utilizing two transceivers 310 having smaller bandwidths to respectively correspond to two carriers needs to be higher than reception performance of utilizing one transceiver 310 having a larger bandwidth to correspond to two carriers. Therefore, before performing the first selection step, the wireless communication apparatus 200 utilizes the first transceiver 310-1 and the second transceiver 310-2 each having a processing bandwidth of 40 MHz to correspond to the carrier A 412 and the carrier B 414 each having a bandwidth of only 20 MHz, respectively. After the first selection step, the wireless communication apparatus 200 utilizes one single second transceiver 310-2 to correspond to the carrier A 412 and the carrier A 414, and releases the first transceiver 310-1 to receive information of nearby base stations. In the embodiment, although the reception performance of utilizing one single second transceiver 310-2 may be lowered, overall performance is not greatly affected.

The previous two embodiments associated with the first selection step are examples of frequency division duplexing (FDD). An example of timing division duplexing (TDD) is given with reference to FIG. 4B below. In FDD, an uplink and a downlink of the wireless communication apparatus 200 utilize different frequencies. In general, the uplink and downlink frequencies differ by a fixed offset value, so that the wireless communication of the uplink and the downlink can be concurrently performed. In TDD, the uplink and the downlink utilize the same frequency, and the communication of the uplink and the downlink is performed according to known uplink and downlink timeslots.

When the system shown in FIG. 4B is a TDD system, given that the uplink and downlink timeslots are identical, the second transceiver 310-2 is then capable of simultaneously processing the carrier A 412 and the carrier B 414. In general, the uplink and downlink timeslots of a carrier may be fixed or may be known to each other, and mode codes are utilized to represent various modes of the uplink and downlink timeslots. Assuming that the uplink and downlink timeslots of the carrier A 412 and the carrier B 414 are different, one single transceiver 310 cannot be utilized to correspond to the two carriers. In contrast, assuming that the uplink and downlink timeslots or the mode codes of the uplink and downlink timeslots of the carrier A 412 and the carrier B 414 are the same, one single second transceiver 310-2 may be utilized to correspond to both the carrier A 412 and the carrier B 414, such that the first transceiver 310-1 can be released to receive information of nearby base stations.

One main spirit of the first selection step is to redistribute the correspondence between the transceivers 310 and the component carriers, so that the transceivers 310 with sufficient processing bandwidths can be utilized to concurrently handle multiple component carriers in the same waveband after the component carriers are redistributed. Thus, the wireless communication apparatus 200 may release at least one transceiver 310 to receive information of nearby base stations. It should be noted that, in the three embodiments above, the component carriers in the same waveband are continuous. For multiple non-continuous component carriers in the same waveband, the present invention can also be suitably applied to the same transceiver 310 to process these non-continuous component carriers, even though this transceiver 310 needs to perform a special process on non-carrier frequencies in between to prevent non-carrier noises from affecting the carriers.

Figure 5A:
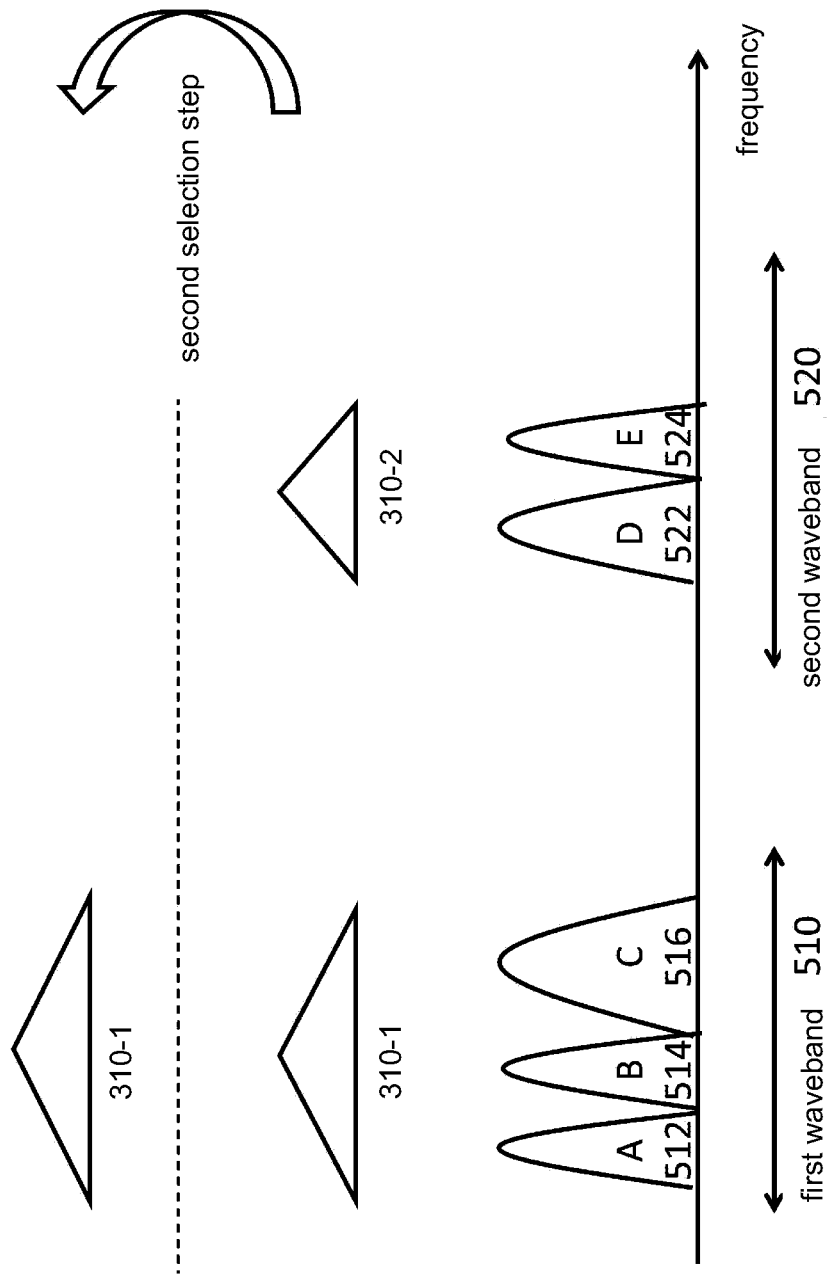
FIG. 5A is schematic diagram of a second selection step performed by a wireless communication apparatus according to an embodiment of the present invention.

FIG. 5A shows a schematic diagram of a second selection step performed by the wireless communication apparatus 200 according to an embodiment of the present invention. In FIG. 5A, two wavebands 510 and 520 include three component carriers (a carrier A 512, a carrier B 514 and a carrier C 516) and two component carriers (a carrier D 522 and a carrier E 524), respectively. Two transceivers 310-1 and 310-2 included in the wireless communication apparatus 200 correspond to the multiple carriers in the two wavebands 510 and 520, respectively. One main spirit of the second selection step is to select the transceiver 310 that corresponds to a least quantity of component carriers from the transceivers 310 to reduce influences upon overall communication.

In the embodiment in FIG. 5A, the quantity of the component carriers corresponding to the first transceiver 310-1 is three, and the quantity of the component carriers corresponding to the second transceiver 310-2 is two. After performing the second selection step, as the second transceiver 310-2 has a smaller quantity of corresponding component carriers, the second transceiver 310-2 is selected, and the communication of the second transceiver 310-2 for the component carriers 522 and 524 is terminated to render the second transceiver 310-2 to receive information of nearby base stations.

Figure 5B:
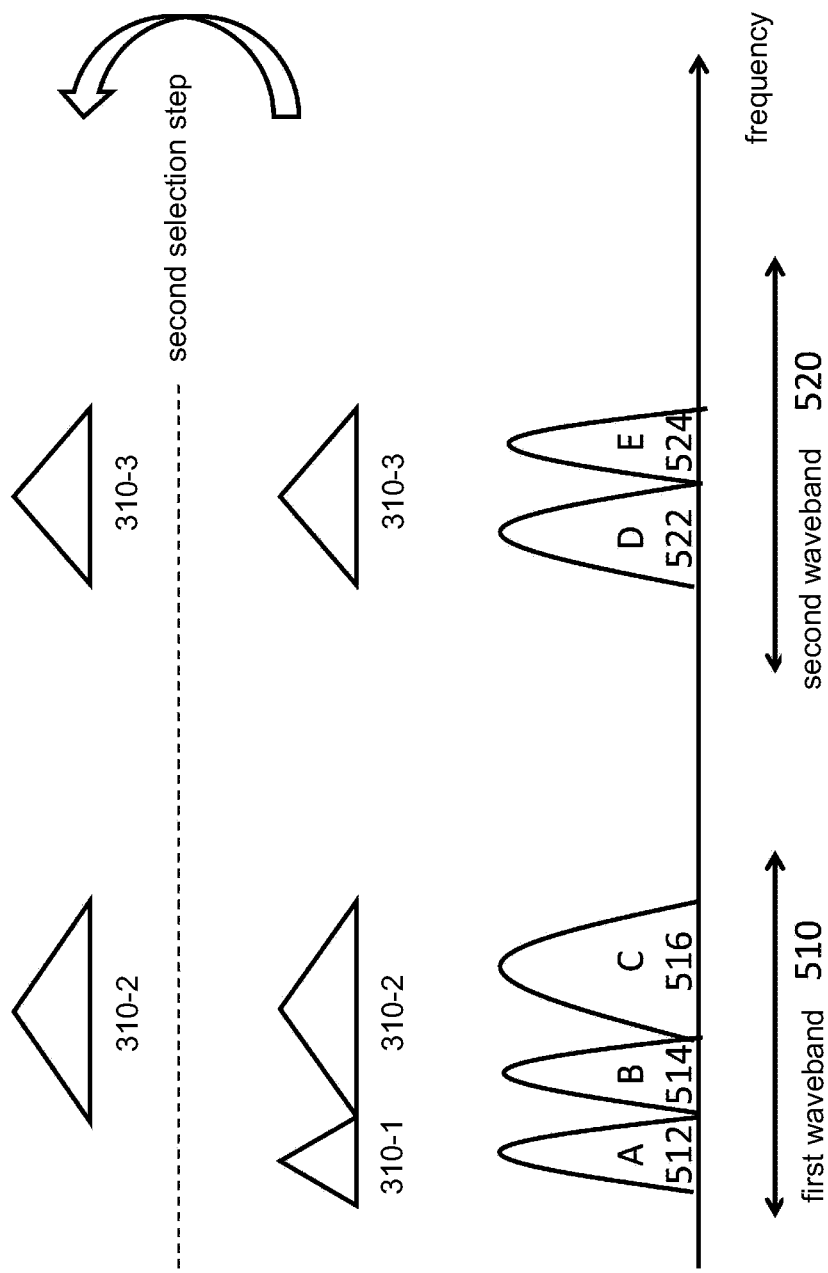
FIG. 5B is a schematic diagram of a second selection step performed by a wireless communication apparatus according to another embodiment of the present invention.

FIG. 5B shows a schematic diagram of a second selection step performed by the wireless communication apparatus 200 according to another embodiment of the present invention. As seen from FIG. 5B, the first transceiver 310-1 corresponds to only one component carrier, and the second transceiver 310-2 and the third transceiver 310-3 both correspond to two component carriers. Thus, the second selection step selects the first transceiver 310-1 to terminate the communication for the component carrier 512, and renders the first transceiver 310-1 to receive information of nearby base stations.

Figure 5C:
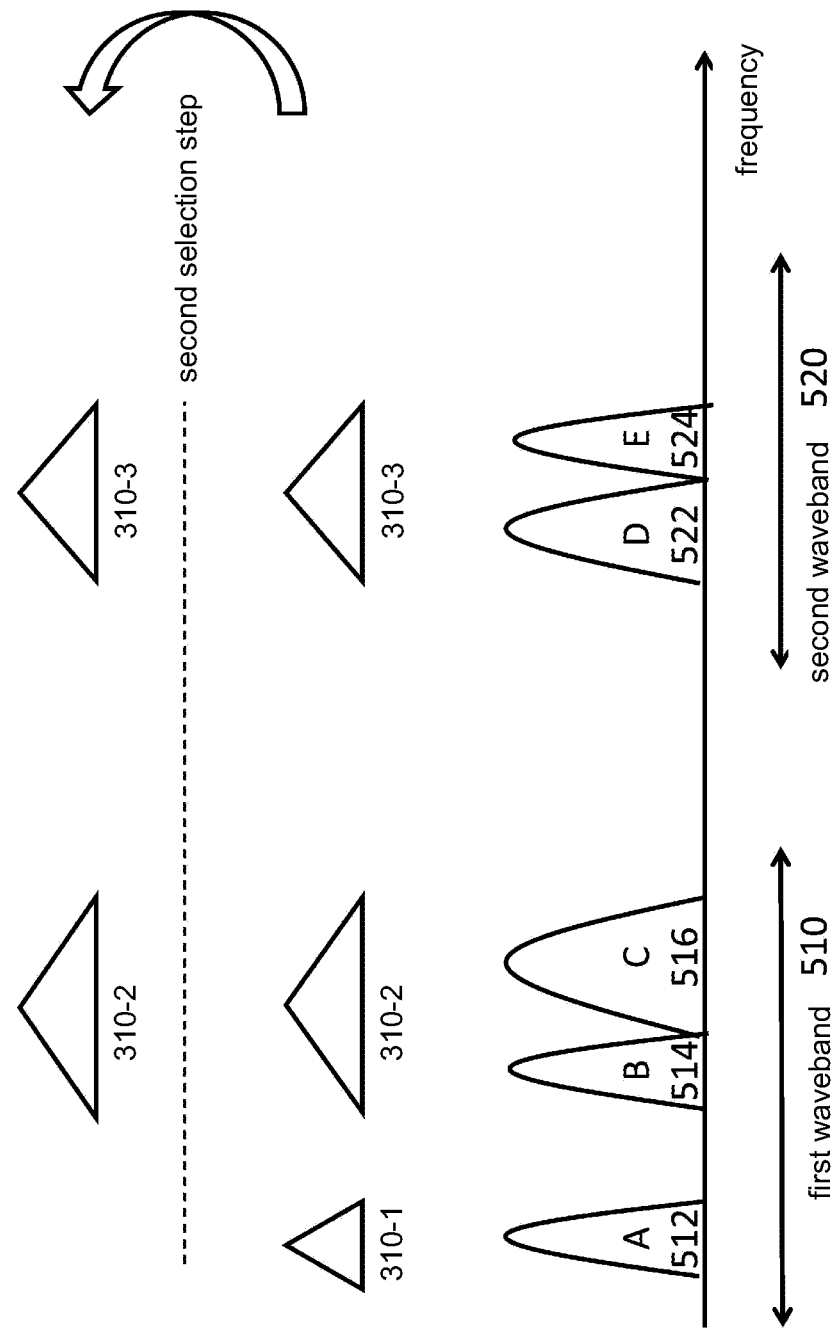
FIG. 5C is a schematic diagram of a second selection step performed by a wireless communication apparatus according to yet another embodiment of the present invention.

FIG. 5C shows a schematic diagram of a second selection step performed by the wireless communication apparatus 200 according to yet another embodiment of the present invention. As seen from FIG. 5C, the first transceiver 310-1 corresponds to only one component carrier, and the second transceiver 310-2 and the third transceiver 310-3 both correspond to two component carriers. Thus, the second selection step selects the first transceiver 310-1 to terminate the communication for the component carrier 512, and renders the first transceiver 310-1 to receive information of nearby base stations.

Figure 5D:
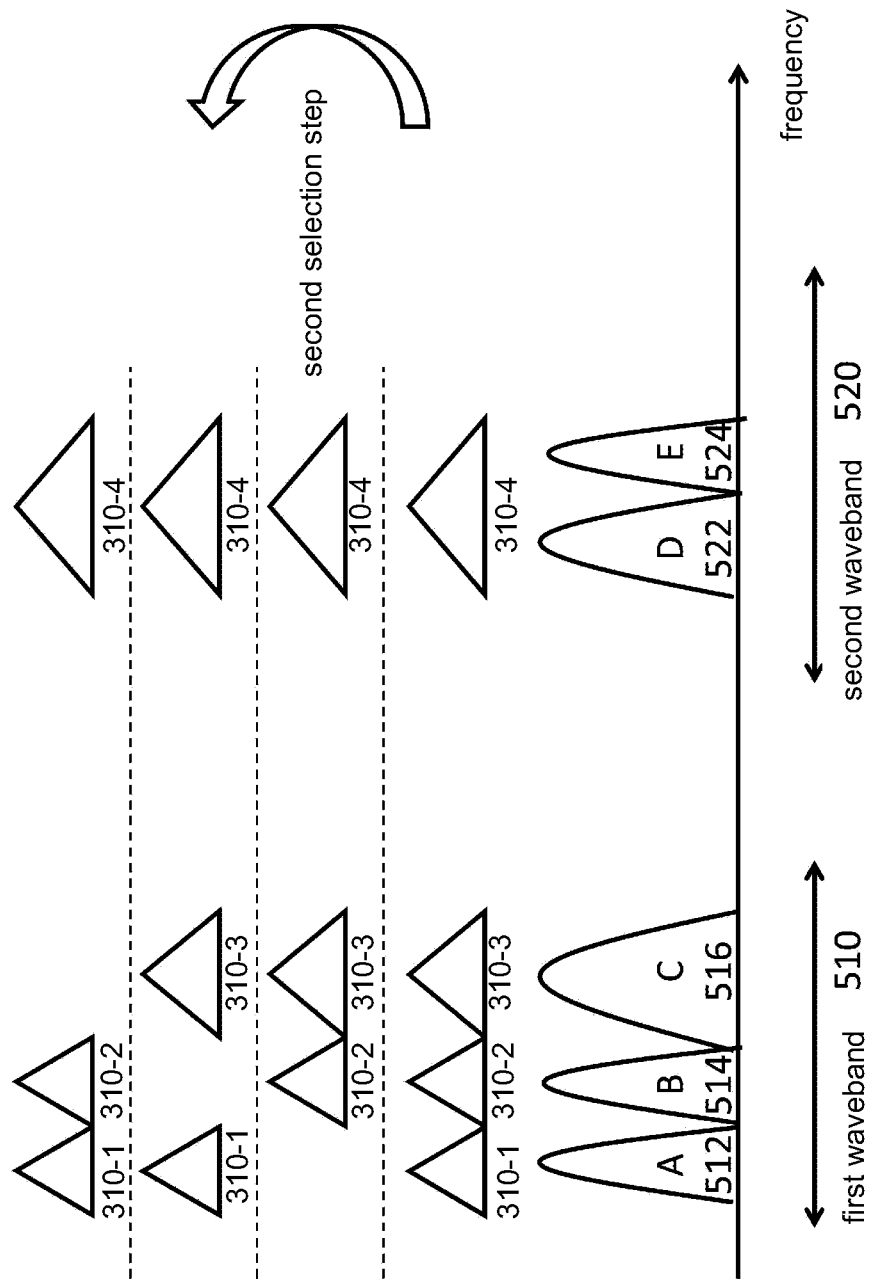
FIG. 5D is a schematic diagram of a second selection step performed by a wireless communication apparatus according to yet another embodiment of the present invention.

FIG. 5D shows a schematic diagram of a second selection step performed by the wireless communication apparatus 200 according to yet another embodiment of the present invention. As seen from FIG. 5D, the first transceiver 310-1, the second transceiver 310-2 and the third transceiver 310-3 respectively correspond to only one component carrier, and the fourth transceiver 310-4 corresponds to two component carriers. As such, it is indicated in FIG. 5 that the second selection step may generate three outcomes—the first transceiver 310-1, the second transceiver 310-2 or the third transceiver 310-3 is selected to receive information of nearby base stations.

Figure 6A:
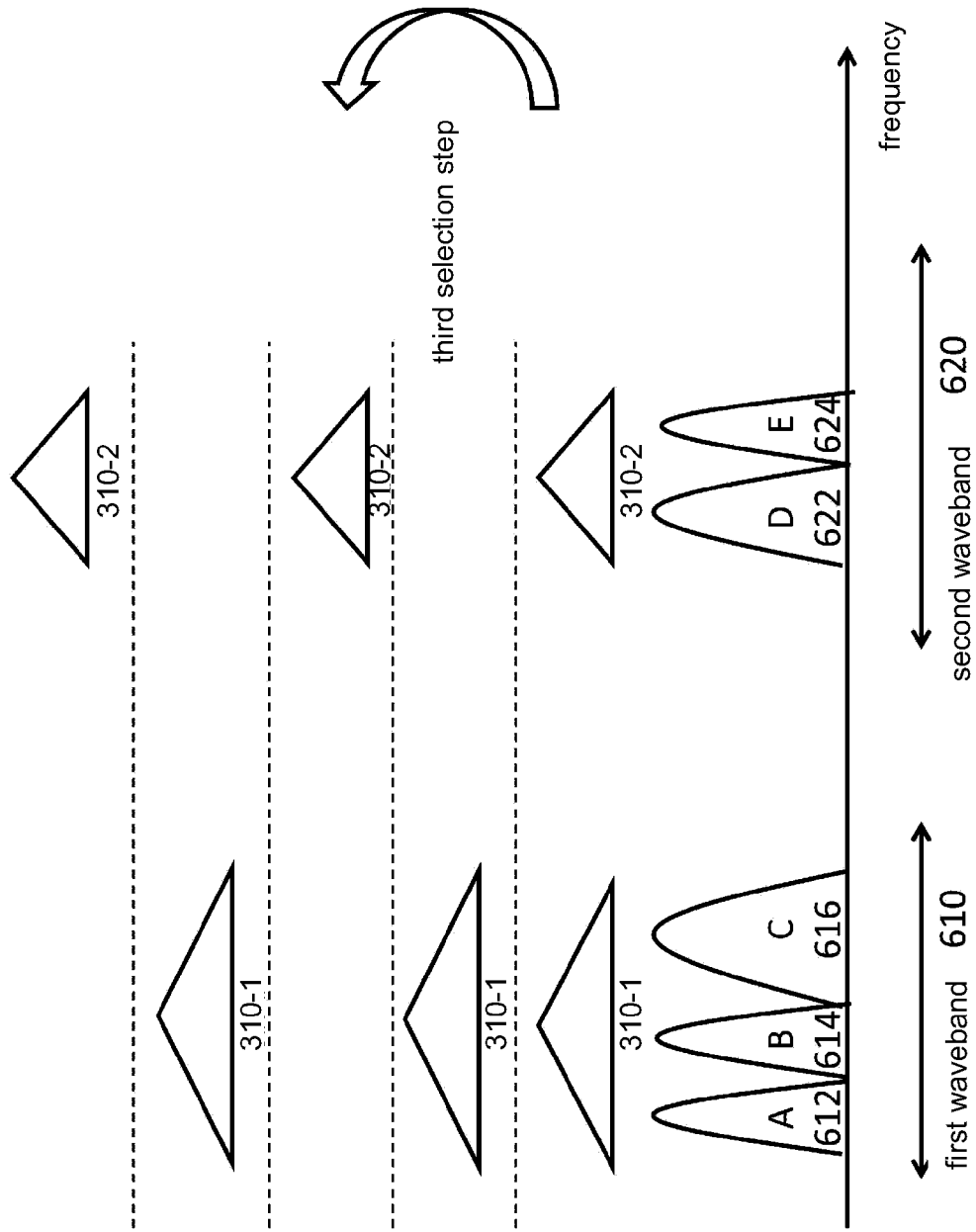
FIG. 6A is a schematic diagram of a third selection step performed by a wireless communication apparatus according to an embodiment of the present invention.

FIG. 6A shows a schematic diagram of a third selection step performed by the wireless communication apparatus 200 according to an embodiment of the present invention. In FIG. 6A, two wavebands 610 and 620 includes three component carriers (a carrier A 612, a carrier B 614 and a carrier C 616) and two component carriers (a carrier D 622 and a carrier E 624), respectively. Two transceivers 310-1 and 310-2 included in the wireless communication apparatus 200 correspond to the multiple carriers in the two wavebands 610 and 620, respectively. One main spirit of the third selection step is to select multiple transceivers 310 in turn. In the embodiment shown in FIG. 6A, the two transceivers 310-1 and 310-2 included in the wireless communication apparatus 200 are released in turn to receive information of nearby base stations.

Figure 6B:
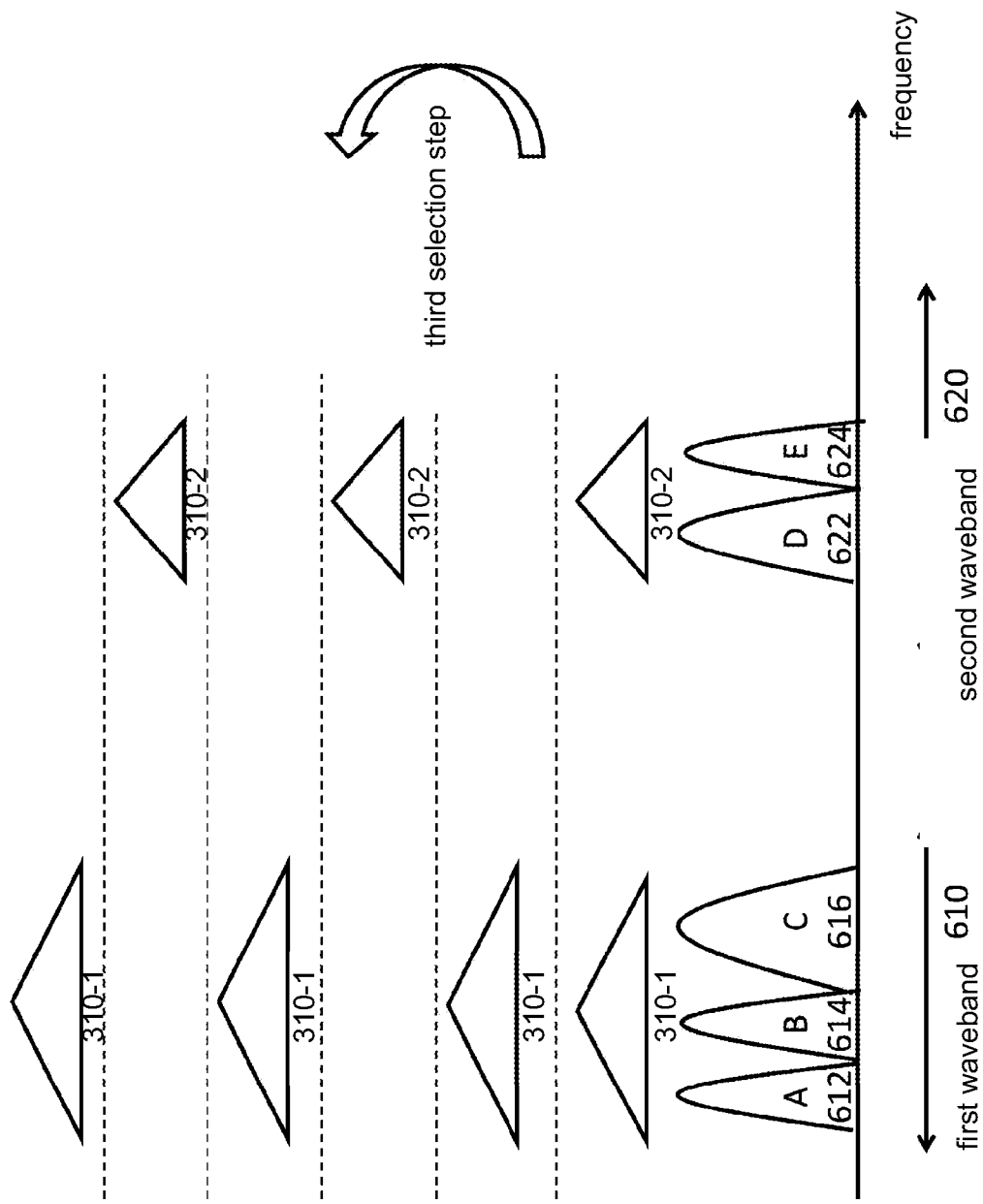
FIG. 6B is a schematic diagram of a third selection step performed by a wireless communication apparatus according to another embodiment of the present invention.

FIG. 6B shows a schematic diagram of a third selection step performed by the wireless communication apparatus 200 according to another embodiment of the present invention. In the embodiment, the third selection step may adopt a weighted rotating method. For example, the quantities of the component carriers corresponding to the transceivers 310 are adopted as weighting values. In FIG. 6B, the quantity of the component carriers corresponding to the first transceiver 310-1 is three, and the quantity of the component carriers corresponding to the second transceiver 310-2 is two. Thus, a ratio of the number of times that the first transceiver 310-1 is selected is ⅖, and a ratio of the number of times that the second transceiver 310-2 is selected is ⅗. From FIG. 6B, outcomes of performing the third selection step five times are seen, as the first transceiver 310-2 is selected twice and the second transceiver 310-2 is selected three times.

In addition to utilizing the quantity of the component carriers as the calculation basis for the weighting values, total bandwidths of the component carriers or bandwidth processing capabilities of the transceivers 310 may also be utilized. One person skilled in the art can understand that, in one embodiment, as the total bandwidth of component carriers corresponding to one transceiver 310 gets larger, the ratio of that transceiver 310 being selected gets smaller. In another embodiment, as the total processing bandwidth of one transceiver 310 gets larger, the ratio of that transceiver 310 being selected gets smaller.

In a fourth selection step provided by the present invention, a transceiver 310 is selected according to statuses of the transceivers 310 and/or the component carriers. In an embodiment, assume that the bandwidth processing capability of the first transceiver 310-1 is 60 MHz, and the bandwidth processing capability of the second transceiver 310-2 is 40 MHz. Thus, the fourth selection step selects the second transceiver 310-2 to receive information of nearby base stations. In another embodiment, assume that the total bandwidth of the component carriers corresponding to the first transceiver 310-1 is 60 MHz, and the total bandwidth of the component carriers corresponding to the second transceiver 310-2 is 40 MHz. Thus, the fourth selection step selects the second transceiver 310-2 to receive information of nearby base stations. In yet another embodiment, the fourth selection step primarily selects the corresponding transceiver 310 according to reception and/or transmission statuses of the component carriers. Assuming that a channel quality indicator (CQI) of one component carrier is the least satisfactory of all component carriers, the fourth selection step selects the transceiver 310 corresponding to this component carrier to receive information of nearby base stations. In the three embodiments above, the fourth selection step primarily selects the transceiver 310 that least affects the communication performance according to the statuses of the transceivers 310 and/or the component carriers.

In a fifth selection step provided by the present invention, a transceiver 310 is selected primarily according to contents carried in the component carriers. In an embodiment, assuming that one component carrier carries a control signal, e.g., a channel control signal or an upper-layer instruction of a protocol stack, the fifth selection step then avoid selecting the transceiver 310 correspond to this component carrier. In another embodiment, assuming that one component carrier communicates with a service-providing primary base station and another component carrier communicates with a service-providing secondary base station, the fifth selection step then avoid selecting the transceiver 310 corresponding to the component carrier that communicates with the primary base station. In another embodiment, assuming one component carrier carries real-time data and another component carrier carries non-real-time data, the fifth selection step then avoids selecting the transceiver 310 corresponding to the component carrier that carries real-time data.

In other words, the fifth selection step selects a transceiver corresponding to a component carrier that satisfies predetermined communication contents according to contents carried in the component carriers. In the three embodiments above, the communication contents may include non-control signals, non-real-time information, or information of communication with a secondary base station.

A sixth selection of the present invention primarily selects a transceiver that least affects uplink communication. In a half-duplex or TDD communication mode, uplink communication and downlink communication do not concurrently take place. However, in a full-duplex or FDD communication mode, uplink communication and downlink communication may concurrently occur. However, when one transceiver 310 is utilized to receive information of nearby base stations, the transceiver 310 may not be able to send uplink signals to the first base station 210. Thus, by exercising such characteristic, the sixth selection step selects transceivers 310 corresponding to the component carrier that receives only downlink signals and does not send uplink signals. As such, communication of the component carriers that send uplink signals are not affected.

Figure 7:
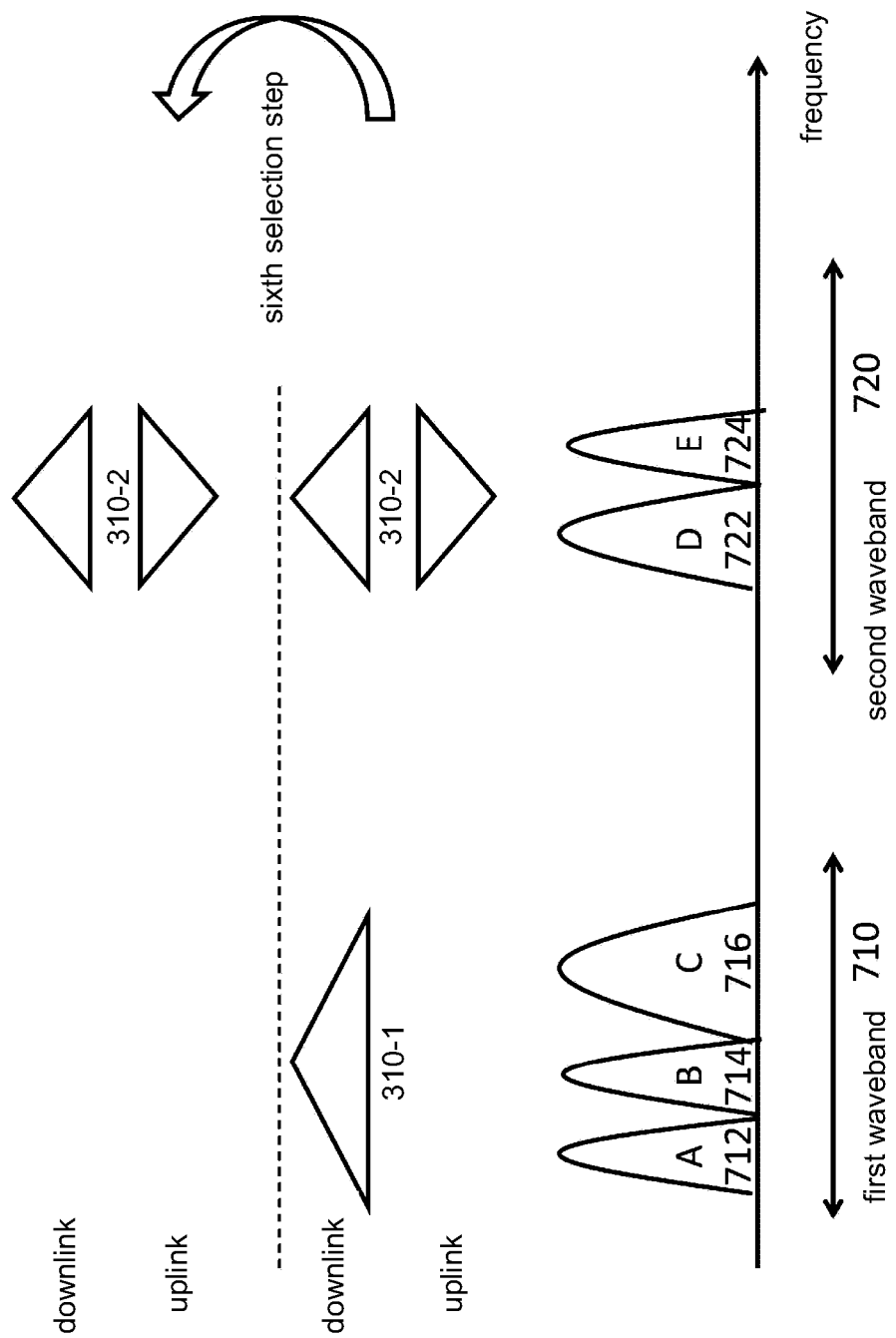
FIG. 7 is a schematic diagram of a sixth selection step performed by a wireless communication apparatus according to an embodiment of the present invention.

FIG. 7 shows a sixth selection step performed by the wireless communication apparatus 200 according to an embodiment of the present invention. Two transceivers 310 are depicted in FIG. 7. The first transceiver 310-1 corresponds to three carriers 712, 714 and 716 in a first waveband 710. The second transceiver 310-2 corresponds to two carriers 722 and 724 in a second waveband 720. In the embodiment, the three component carriers in the first waveband 710 need not send uplink signals to the first transceiver 310-1, and the two component carriers in the second waveband 720 requires the second transceiver 310-2 to send uplink signals. Thus, the sixth selection step selects the transceiver 310 corresponding to the component carriers that need not send the uplink signals, i.e., the first transceiver 310-1 in FIG. 7, to receive information of nearby base stations.

Figure 8:
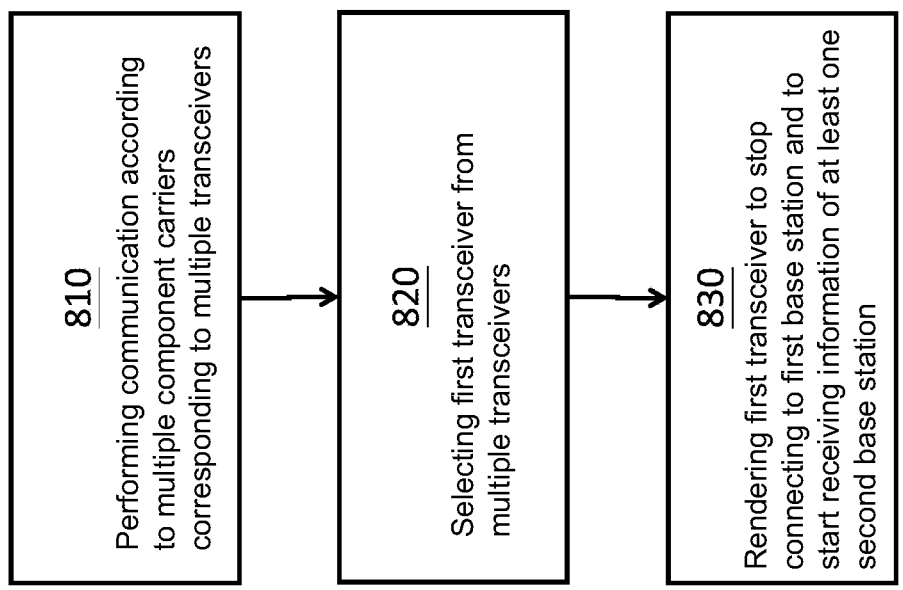
FIG. 8 is a flowchart of a process of a wireless communication method according to an embodiment of the present invention.

FIG. 8 shows a flowchart of a wireless communication method according to an embodiment of the present invention. The wireless communication method is applicable to a wireless communication apparatus having multiple transceivers. Each of the transceivers connects to at least one first base station via at least one component carrier.

In step 810, communication is performed according to multiple component carriers corresponding to the multiple transceivers. In another example, step 810 may perform communication after aggregating multiple component carriers corresponding to the multiple transceivers. It should be noted that the present invention is not limited to applications of apparatuses and methods that support carrier aggregation.

In step 820, while performing communication by simultaneously utilizing the multiple transceivers, a first transceiver is selected from the multiple transceivers.

In step 830, the first transceiver is rendered to stop connecting to the first base station and to start receiving information of at least one second base station.

Figure 9A:
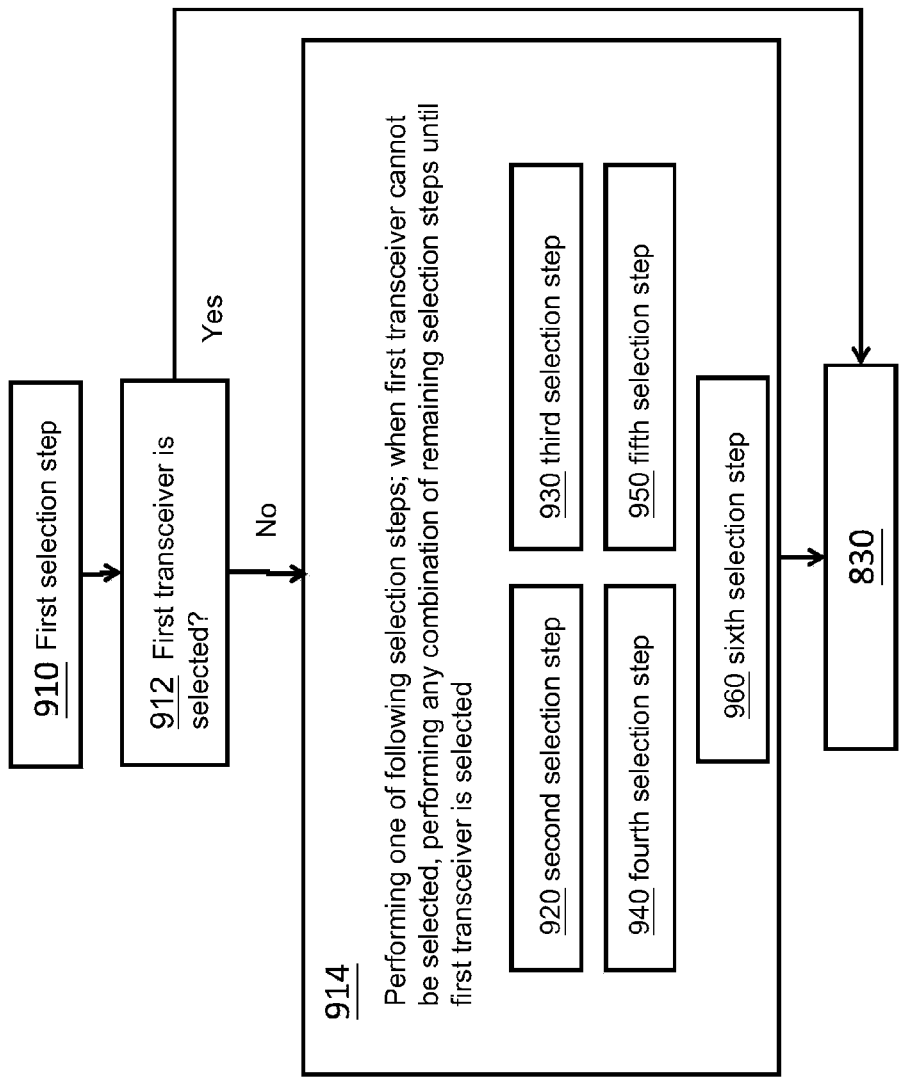
FIG. 9A is a detailed flowchart of step 820 in FIG. 8 according to an embodiment of the present invention.

In step 820, the step of selecting the first transceiver from the multiple transceivers may include one of multiple selection steps. FIG. 9A shows a detailed flowchart of step 820 in FIG. 8 according to an embodiment of the present invention.

As previously described, the first selection step may select a transceiver that replaces the first transceiver, and utilize the first transceiver to receive information of nearby base stations given that the communication performance is least affected. Thus, in the embodiment shown in FIG. 9A, the first selection step has the highest priority to be performed, and other selection steps are performed only when the first selection is incapable of selecting the first transceiver. Therefore, the first selection step 910 is first performed to select a second transceiver from the multiple transceivers, and to render the second transceiver to connect the first base station via the component carrier corresponding to the first transceiver. The component carrier corresponding to the second transceiver and the component carrier corresponding to the first transceiver are continuous carriers in the same waveband.

In step 912, it is determined whether the first transceiver is selected. The process proceeds to step 830 shown in FIG. 8 when the first transceiver is selected in the first selection step 910, or else step 914 is performed when no second transceiver for replacing the first transceiver is selected in step 910. In step 914, one of the multiple selection steps below is performed. When no first transceiver is selected, any combination of the remaining steps is performed until the first transceiver is selected. The multiple steps include steps 920 to 960 below.

In the second selection step 920, the transceiver corresponding to the least quantity of component carriers is selected from the multiple transceivers.

In the third selection step 930, the transceiver is selected from the multiple transceivers in turn. The method of selecting the transceiver from the multiple transceivers in turn includes one of: evenly selecting the transceiver from the multiple transceivers in turn; and assigning weighting values to the transceivers according to respective characteristics of the transceivers and selecting the transceiver from the multiple transceivers in turn according to ratios of the weighting values. In one embodiment, the characteristic values include at least one of the bandwidth processing capabilities of the respective transceivers and the quantities of the component carriers corresponding to the respective transceivers.

In the fourth selection step 940, the transceiver with least influences is selected according to statuses of the component carriers corresponding to the multiple transceivers. In one embodiment, the transceiver with the least influences corresponds to the component carrier with a least satisfactory channel quality among the multiple component carriers. In another embodiment, a total bandwidth of the component carrier corresponding to the transceiver with least influences is smaller than total bandwidths of the component carriers corresponding to the remaining transceivers.

In the fifth selection step 950, according to communication contents carried by multiple component carriers corresponding to the multiple transceivers, a transceiver corresponding to the component carrier compliant to predetermined communication contents is selected. In an embodiment, the communication contents do not include any of communication information to a primary base station, control information and real-time information.

In the sixth selection step 960, according to whether the component carriers corresponding to the multiple transceivers transmit signals, the transceiver corresponding to the component carrier that does not transmit signals is selected. In an embodiment, at least one of the multiple component carriers does not transmit signals, and the component carriers corresponding to the transceiver selected by the sixth selection step includes the component carrier that does not transmit signals.

Figure 9B:
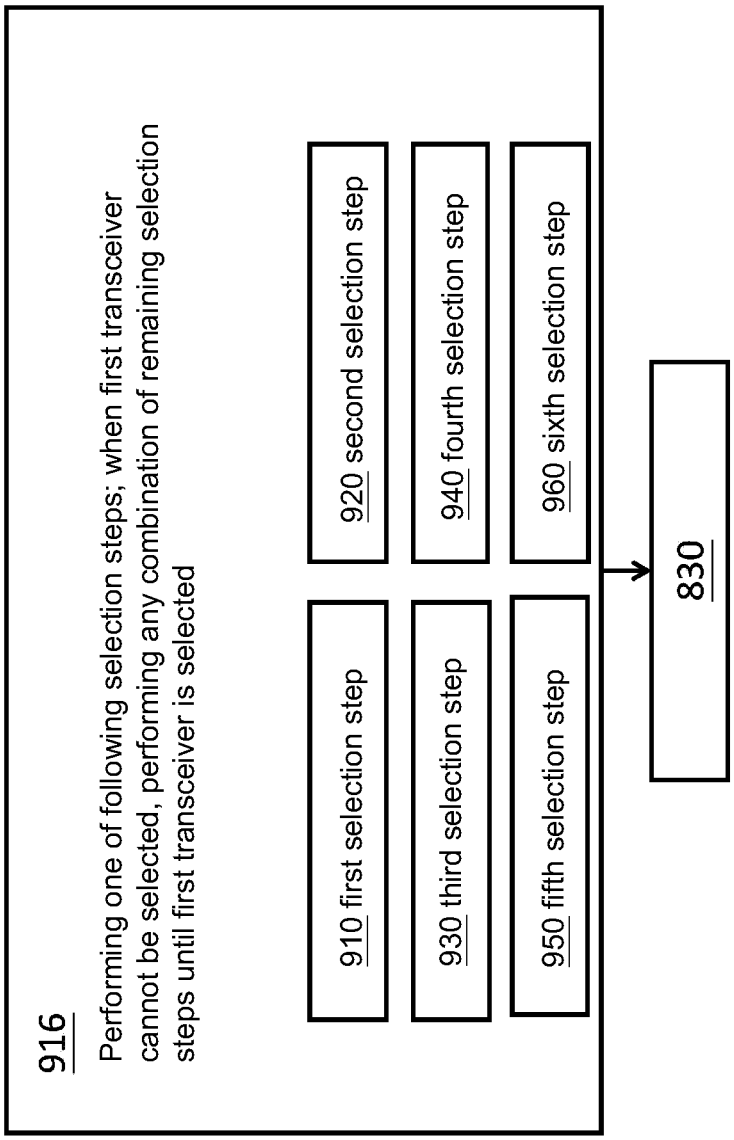
FIG. 9B is a detailed flowchart of step 820 in FIG. 8 according to another embodiment of the present invention.

FIG. 9B shows a detailed flowchart of step 820 according to another embodiment of the present invention. Different from FIG. 9A, the first selection step 910 in the embodiment in FIG. 9B does not have the highest priority to be performed. Thus, step 916 performs one of the selection steps 910 to 960. When no first transceiver is selected or the selected transceiver is inoperable in the waveband of the under-detection base station, any combination of the remaining selection steps is performed until the first transceiver is selected.

Therefore, with the wireless communication apparatus and method of the present invention, given carrier aggregation is satisfied as much as possible, one of the transceivers is called to receive information of another base station. For a wireless communication apparatus having multiple transceivers, even when carrier aggregation is not supported, one of the transceivers may also be called to receive information of another base station. During the process of calling the transceiver, a part of communication contents transmitted by a part of carriers may be sacrificed. However, from perspectives of overall communication efficiency, if signals can be handed over to a base station that provides better wireless services as early as possible, the wireless communication efficiency of all of the component carriers need not be reduced as a trade-off. From such perspectives, the wireless communication apparatus and method of the present invention are capable of enhancing utilization efficiency of wireless spectra to further save time and resources for processing wireless signals.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless communication apparatus, comprising:
a plurality of transceivers, corresponding to a plurality of component carriers, wherein at least one of the transceivers connects to at least one first base station via at least one of the component carriers;
a communication module, connected to the transceivers, configured to perform communication according to the component carriers corresponding to the transceivers; and
a processing module, while communication is performed by simultaneously utilizing the transceivers, configured to select a first transceiver from the transceivers to receive information of at least one second base station, to select a second transceiver from the transceivers, and to render the second transceiver to connect to the first base station via the component carrier corresponding to the first transceiver, wherein the component carrier corresponding to the second transceiver and the component carrier corresponding to the first transceiver are continuous carriers in a same waveband, to select the transceiver corresponding to a least quantity of component carriers from the transceivers, to select the transceiver from the transceivers in turn, to select the transceiver with least influences according to statuses of the component carriers corresponding to the transceivers wherein a total bandwidth of the component carrier corresponding to the transceiver with the least influences is smaller than respective total bandwidths of the component carriers corresponding to the other transceivers, to select the transceiver corresponding to the component carrier that carries communication contents; and to select the transceiver corresponding to the component carrier that only receives signals.

2. The wireless communication apparatus according to claim 1, wherein the communication module performs communication after aggregating the component carriers to support a carrier aggregation function.

3. The wireless communication apparatus according to claim 2, wherein the information of the at least one second base station comprises a wireless identity and a global identity, the wireless identity may represent a plurality of base stations, the global identity exclusively represents the at least one second base station, and the first transceiver opens an autonomous gap to receive the information of the at least one second base station.

4. The wireless communication apparatus according to claim 1, wherein the first transceiver opens a measurement gap to receive the information of the at least one second base station, and the information of the at least one second base station comprises at least one of a signal strength and a wireless identity that may represent a plurality of base stations.

5. The wireless communication apparatus according to claim 1, wherein when the processing module cannot process any part of selecting the first transceiver, the processing module performs any combination of the remaining selecting functions until the first transceiver is selected.

6. The wireless communication apparatus according to claim 1, wherein when the transceivers utilize the component carriers by time division duplexing (TDD), the component carrier corresponding to the second transceiver and the component carrier corresponding to the first transceiver have same transmission and reception timing settings.

7. The wireless communication apparatus according to claim 1, the processing module selects the transceiver by evenly selecting the transceiver from the transceivers in turn, or by generating weighting values according to characteristic values of the respective transceivers, and selecting the transceiver from the transceivers according to respective ratios associated with the weighting values, wherein the characteristic values comprise at least one of:
bandwidth processing capabilities of the respective transceivers; and
quantities of the component carriers corresponding to the respective transceivers.

8. The wireless communication apparatus according to claim 1, wherein the transceiver with the least influences corresponds to the component carrier that has a least satisfactory communication quality among the component carriers.

9. The wireless communication apparatus according to claim 1, wherein the communication contents exclude information of communication to a primary base station, control information and real-time information.

10. The wireless communication apparatus according to claim 1, wherein at least one of the component carriers is utilized to only receive signals, and the component carrier corresponding to the first transceiver selected by the sixth selection step comprises the component carrier that only receives signals.

11. A wireless communication method, applied to a wireless communication apparatus comprising a plurality of transceivers, the transceivers corresponding to a plurality of component carriers, at least one of the transceivers connecting to at least first base station via at least one of the component carriers, the wireless communication method comprising:
performing communication according to the component carriers corresponding to the transceivers; and
while communication is performed by simultaneously utilizing the transceivers, selecting a first transceiver from the transceivers to receive information of at least one second base station;
wherein the step of selecting the first transceiver from the transceivers comprises at least one of:
a first selection step, selecting a second transceiver from the transceivers, and renders the second transceiver to connect to the first base station via the component carrier corresponding to the first transceiver, wherein the component carrier corresponding to the second transceiver and the component carrier corresponding to the first transceiver are continuous carriers in a same waveband;
a second selection step, selecting the transceiver corresponding to a least quantity of component carriers from the transceivers;
a third selection step, selecting the transceiver from the transceivers in turn;
a fourth selection step, selecting the transceiver with least influences according to statuses of the component carriers corresponding to the transceivers, wherein a total bandwidth of the component carrier corresponding to the transceiver with the least influences is smaller than respective total bandwidths of the component carriers corresponding to the other transceivers;
a fifth selection step, selecting the transceiver corresponding to the component carrier that carries communication contents; and
a sixth selection step, selecting the transceiver corresponding to the component carrier that only receives signals.

12. The wireless communication method according to claim 11, wherein the step of performing communication performs communication after aggregating the component carriers to support a carrier aggregation function.

13. The wireless communication method according to claim 12, wherein the information of the at least one second base station comprises a wireless identity and a global identity, the wireless identity may represent a plurality of base stations, the global identity exclusively represents the at least one second base station, and the first transceiver opens an autonomous gap to receive the information of the at least one second base station.

14. The wireless communication method according to claim 11, the first transceiver opens a measurement gap to receive the information of the at least one second base station, and the information of the at least one second base station comprises at least one a signal strength, and a wireless identity that may represent a plurality of base stations.

15. The wireless communication method according to claim 11, wherein when one of the selection steps is performed and the first transceiver cannot be selected, any combination of the remaining selection steps is performed until the first transceiver is selected.

16. The wireless communication method according to claim 11, wherein when the transceivers utilize the component carriers by TDD, the component carrier corresponding to the second transceiver and the component carrier corresponding to the first transceiver have same transmission and reception timing settings.

17. The wireless communication method according to claim 11 wherein in the third selection step, the transceiver is selected from the transceivers in turn according to one of:
evenly selecting the transceiver from the transceivers in turn; and
generating weighting values according to characteristic values of the respective transceivers, and selecting the transceiver from the transceivers according to respective ratios associated with the weighting values, wherein the characteristic values comprise at least one of:
bandwidth processing capabilities of the respective transceivers; and
quantities of the component carriers corresponding to the respective transceivers.

18. The wireless communication method according to claim 11, wherein in the fourth selection step, the transceiver with the least influences corresponds to the component carrier that has a least satisfactory communication quality among the component carriers.

19. The wireless communication method according to claim 11, wherein in the fourth selection step, a total bandwidth of the component carrier corresponding to the transceiver with the least influences is smaller than respective total bandwidths of the component carriers corresponding to the other transceivers.

20. A wireless communication method, applied to a wireless communication apparatus comprising a plurality of transceivers, the transceivers corresponding to a plurality of component carriers, at least one of the transceivers connecting to at least first base station via at least one of the component carriers, the wireless communication method comprising:

performing communication according to the component carriers corresponding to the transceivers; and while communication is performed by simultaneously utilizing the transceivers, selecting a first transceiver from the transceivers to receive information of at least one second base station;

wherein the step of selecting the first transceiver from the transceivers comprises at least one of:

a first selection step, selecting a second transceiver from the transceivers, and renders the second transceiver to connect to the first base station via the component carrier corresponding to the first transceiver, wherein the component carrier corresponding to the second transceiver and the component carrier corresponding to the first transceiver are continuous carriers in a same waveband;

a second selection step, selecting the transceiver corresponding to a least quantity of component carriers from the transceivers;

a third selection step, selecting the transceiver from the transceivers in turn;

a fourth selection step, selecting the transceiver with least influences according to statuses of the component carriers corresponding to the transceivers;

a fifth selection step, selecting the transceiver corresponding to the component carrier that carries communication contents, wherein the communication contents exclude information of communication to a primary base station, control information and real-time information; and a sixth selection step, selecting the transceiver corresponding to the component carrier that only receives signals.

21. A wireless communication method, applied to a wireless communication apparatus comprising a plurality of transceivers, the transceivers corresponding to a plurality of component carriers, at least one of the transceivers connecting to at least first base station via at least one of the component carriers, the wireless communication method comprising:

performing communication according to the component carriers corresponding to the transceivers; and while communication is performed by simultaneously utilizing the transceivers, selecting a first transceiver from the transceivers to receive information of at least one second base station;

wherein the step of selecting the first transceiver from the transceivers comprises at least one of:

a first selection step, selecting a second transceiver from the transceivers, and renders the second transceiver to connect to the first base station via the component carrier corresponding to the first transceiver, wherein the component carrier corresponding to the second transceiver and the component carrier corresponding to the first transceiver are continuous carriers in a same waveband;

a second selection step, selecting the transceiver corresponding to a least quantity of component carriers from the transceivers;

a third selection step, selecting the transceiver from the transceivers in turn;

a fourth selection step, selecting the transceiver with least influences according to statuses of the component carriers corresponding to the transceivers;

a fifth selection step, selecting the transceiver corresponding to the component carrier that carries communication contents, wherein; and a sixth selection step, selecting the transceiver corresponding to the component carrier that only receives signals, wherein at least one of component carriers is utilized to only receive signals, and the component carrier corresponding to the first transceiver selected by the sixth selection step comprises the component carrier that only receives signals.

* * * * *